United States Patent [19]
Dixon et al.

[11] Patent Number: 6,099,232
[45] Date of Patent: Aug. 8, 2000

[54] DEVICE FOR LOADING A SMALL VEHICLE OR OTHER LOAD ONTO A PICKUP TRUCK

[76] Inventors: Steven C. Dixon; James W. Dixon, both of 81 Alt House Hill Rd., Oakland, Md. 21550

[21] Appl. No.: 09/302,292

[22] Filed: Apr. 30, 1999

Related U.S. Application Data

[60] Provisional application No. 60/083,626, Apr. 30, 1998.

[51] Int. Cl.[7] ........................ B60P 3/06
[52] U.S. Cl. .................. 414/494; 414/500; 414/426; 414/563; 414/538; 280/402; 224/310; 298/1 B; 298/12
[58] Field of Search ............... 298/1 B, 12, 14; 224/310; 280/402; 414/498, 499, 537, 538, 500, 477; 501/478, 479, 563, 426

[56] References Cited

U.S. PATENT DOCUMENTS

| | | |
|---|---|---|
| 2,761,577 | 9/1956 | Lahman .................. 414/494 X |
| 3,330,432 | 7/1967 | Blackburn et al. .......... 414/500 X |
| 3,877,594 | 4/1975 | Coakley . |
| 4,274,788 | 6/1981 | Sutton . |
| 4,655,671 | 4/1987 | Pratt . |
| 4,749,317 | 6/1988 | Daniel . |
| 4,930,799 | 6/1990 | Pihlström et al. .......... 414/500 X |
| 4,932,829 | 6/1990 | Miller . |
| 5,234,307 | 8/1993 | Scott . |
| 5,281,075 | 1/1994 | Tatman et al. . |
| 5,394,583 | 3/1995 | Plate . |
| 5,556,249 | 9/1996 | Heine . |

FOREIGN PATENT DOCUMENTS

| | | | |
|---|---|---|---|
| 8607019 | 12/1986 | WIPO ................... | 414/494 |
| WO 88/04618 | 6/1988 | WIPO . | |

*Primary Examiner*—Frank E. Werner
*Attorney, Agent, or Firm*—Richard C. Litman

[57] ABSTRACT

The invention is a loading and unloading device for transporting small recreational or utility vehicles in a pickup truck. The invention comprises two stationary rails mounted on the bed of a truck. A ramp is slidably and pivotally attached to the stationary rails, and an interchangeable vehicle carriage or dump bed is slidably and pivotally mounted to the ramp. In use, the ramp and carriage are lowered by a winch so that the carriage is close to the ground and substantially horizontal. A small vehicle can then be placed on the carriage. A winch then pulls the carriage up the ramp until the vehicle's center of gravity is slightly rearward of the stationary rails. The carriage stops, and the winch pulls the ramp onto the stationary rails. The ramp can then be pushed into the bed of the truck.

17 Claims, 19 Drawing Sheets

DEVICE FOR LOADING A SMALL VEHICLE OR OTHER LOAD ONTO A PICKUP TRUCK

CROSS-REFERENCE TO RELATED APPLICATION

This application claims the benefit of U.S. Provisional Patent Application Serial No. 60/083,626, filed Apr. 30, 1998.

BACKGROUND OF THE INVENTION

1. Field of the Invention

The present invention relates to hoisting ramps for loading vehicles. Specifically, the invention is an apparatus for loading and unloading a motorcycle, snowmobile, other small recreational or utility vehicles, or other similarly sized loads onto the bed of a truck.

2. Description of Related Art

Several past inventors have developed various loading devices for small recreational vehicles. However, each have incumbent disadvantages.

For example, U.S. Pat. No. 3,877,594, issued to Donald L. Coakley, discloses a boat carrier using a beam mounted on top of a car attached to a walker beam, which was in turn attached to a boat trailer. To begin loading the boat, the walker beam is positioned so that it forms a ramp between the roof and the ground, and the trailer is positioned horizontally along the ground. The boat is placed on the trailer. The trailer is pulled onto the walker beam, which is then pulled onto the stationary beam. Once the boat's center of mass passes the end of the stationary rail, the boat, trailer, and walker beam tip over onto the stationary beam. However, allowing the boat to tip over in this manner can tangle the rope, and risk damage to the boat, loader, or car.

U.S. Pat. No. 4,653,671, issued to Stephen C. Pratt, describes a loading/unloading device for boats. The device uses a tilting ramp with a hinged rear section. The boat sits on a wheeled carriage. The ramp is extended, with the rear section sitting flat on the ground, and the boat is rolled down the ramp and into the water. While this is an excellent design for boats, it would be very difficult to use for other vehicles, for example snowmobiles, where snow would interfere with the carriage wheels.

U.S. Pat. No. 5,556,249, issued to Daniel M. Heine, describes a movable ramp used with a wheeled cart. The load is placed on the cart, which is then pulled up the ramp and onto the truck. As with anything which works by pulling a wheeled cart, this invention is of limited value on snow-covered ground.

U.S. Pat. No. 5,234,307, issued to Gerald W. Scott, describes a trailer for motorcycles designed to be used with a rollback tow truck. The rollback tow truck has a horizontal bed which can be moved rearward to form an inclined plane, and has a winch to pull a disabled vehicle onto the truck. This invention, of course, requires the use of a specialized truck.

Other inventions have been described each for another limited purpose. U.S. Pat. No. 4,274,788, issued to Luther M. Sutton, describes a loading device with a stationary frame mounted to a transporting vehicle, a ramp which can be raised onto the vehicle in a horizontal position, and a movable carriage. The vehicle to be transported is placed on the carriage, which is then pulled up the inclined plane. The inclined plane pivots into a horizontal position on top of the transporting vehicle, supporting the carriage. U.S. Pat. No. 4,932,829, issued to Robert W. Miller, also describes a movable inclined plane which, after a motorcycle is placed on it, can be moved either onto a truck bed or into a vertical position on the truck. U.S. Pat. No. 5,394,583, issued to Craig Plate, describes a motorized incline plane using two motors: one to move the inclined plane from a horizontal position on top of a vehicle, and the other to raise and lower the smaller vehicle to be transported. U.S. Pat. No. 4,749,317, issued to Phillip G. Daniel, describes a trailer for recreational vehicles having upper and lower levels. The upper level forms an inclined plane for loading vehicles onto that level using a winch.

U.S. Pat. No. 5,281,075, issued to Darrell J. Tatman and Albert D. Tatman, describes a pivoting ramp which, after a vehicle is driven onto the ramp, rotates to a horizontal position to transport the vehicle. International patent application no. PCT/SE87/00621, published under the Patent Cooperation Treaty, describes a trailer which tilts back to form a ramp for loading vehicles onto it.

Because each of the above noted inventions have specific functions, each is limited is some way. Some of the inventions discussed above require modification of the transporting vehicle before use, unlike the present invention. Many would not be likely to work properly in the snow-covered regions where a snowmobile would likely be used. Many also provide very little control over the path of the carriage and load, allowing the possibility that the loading device, vehicle to be transported, or the transporting vehicle, will be damaged. The present invention avoids these disadvantages and therefore may be more applied a larger universe of problems heretofore addressed by inventions limited in scope.

None of the above inventions and patents, taken either singly or in combination, is seen to describe the instant invention as claimed.

SUMMARY OF THE INVENTION

The invention is an improved device for loading and unloading motorcycles, snowmobiles, and other small recreational and utility vehicles onto a truck. The invention comprises a stationary frame attached to a truck bed. Attached to the stationary frame is a sliding ramp which is movable between a final closed position wherein it sits horizontally on top of the fixed frame, and an extended position wherein it forms an inclined plane between the truck and the ground. A vehicle carriage or dump bed may be interchangeably placed on the ramp. Alternatively, a carriage is pivotally and slidably attached to the ramp at one end, with wheels on the other end. The carriage or dump bed is movable between a closed position wherein it sits on the ramp, and an extended wherein it angularly extends from the rear of the ramp and substantially horizontal along the ground. A pair of winches are used to extend the ramp and carriage from the closed position to the extended position, and to retract them both back to the final closed position. Alternatively, a single winch may perform both functions.

A preferred and suggested loading device comprises a stationary frame, a ramp, and interchangeable carriages. The stationary frame comprises a pair of parallel rails having C-shaped cross sections, with the opening of the open sides facing inward. A crossbeam is secured between the frame's rails, with a bearing secured to each end of the crossbeam and rolling within the frame's beams, thereby allowing the crossbeam to move forward or backward within the beams. The C-shaped beams attach at the rear of the truck to a brace which fits within the pivot holes normally used for the truck's tailgate. The front of the C-shaped beams are secured by support braces extending under the lip of the pickup truck's sidewalls.

The ramp also comprises a pair of parallel rails with C-shaped cross sections, with the openings facing outward, and a bed supported on top of the rails. The sliding ramp is connected to the stationary frame by a set of four bearings, two on each side. The rearmost bearing on each side is attached to the stationary rail, and rolls within the sliding ramp's corresponding lower rail portion. The forward bearing is attached to the sliding ramp, and rolls within the stationary frame's corresponding rail. Additionally, the end of each C-shaped beam of the ramp includes a relatively short swing arm having a U-shaped cross section. The C=shaped beam fits within the U-shape of the swing arm. The swing arm is pivotally attached to the ramp's beam at the point of the forward bearing, and at its other end to the same bearings securing the crossbeam. The ramp also includes an elevated winch support at its forward end.

The carriage may take several different forms, with preferred and suggested configurations including a dump bed and a motorcycle carriage. All configurations include a planar base, with a downward flange at each corner. The base is sufficiently wide for the downward flanges to fit on either side of the ramp. The front of the base includes at least a pair of caster type wheels, and the rear of the base includes detachable wheels. The carriage includes a front portion including an attachment point for a winch, and an attachment point for a pin securing the front of the carriage to the ramp's winch support. The user can therefore selectively lower either the entire carriage containing its load, or the load itself, with the carriage remaining on the ramp.

If a dump bed is installed, it will have forward and side walls, and a rear gate. If a vehicle carriage is installed, it will have a platform appropriate for supporting the vehicle to be transported. A motorcycle carrier, for example, will have a central channel extending from the front to the rear of the carriage, dimensioned and configured to receive the wheels of a motorcycle.

The ramp's degree of elevation is controlled by a winch, preferably mounted within the front of the ramp's platform and connecting to the frame's sliding crossbeam. A second winch, mounted at the top of the winch support, lowers the carriage and/or load. The controls for both winches are located on the winch support. Because the upper winch (lowering the carriage and/or load) will typically be operated with the ramp extended, the lower winch's switch is preferably placed above the upper winch's switch and near the top of the winch support, thereby facilitating access to the lower winch's switch when the ramp is horizontal. The ramp may be slid horizontally either manually, by a motorized threaded rod, or by a motorized chain and sprocket drive.

To load or unload the pickup truck, the ramp is first moved rearward either manually or using a motorized drive. The lower winch is then extended to lower the ramp. At this point, the user has several different options. He may simply open the gate of the dump bed before lowering the ramp, thereby dumping the load (such as firewood) on the ground. He may connect the upper winch to the load, leaving the carriage pinned to the ramp, and lowering the load directly using the winch. He may alternatively connect the winch to the carriage, remove the carriage's securing pin, and lower the carriage onto the ground. Once the carriage is loaded or unloaded with the cargo, the upper winch is used to pull the carriage onto the ramp. The carriage is secured to the winch structure by a pin, and the lower winch is used to raise the ramp. The ramp is then retracted into the pickup truck bed.

If a motorized drive is used to extend and retract the ramp horizontally, this drive will be sufficient to hold the ramp in the truck bed. Otherwise, securing pins are used to secure the ramp in place.

An alternative loading device includes a permanently attached carriage. The stationary frame comprises a pair of parallel rails having C-shaped cross sections, with the open sides facing inward. The ramp comprises a pair of parallel rails, each having a lower section and an upper section. Both sections have C-shaped cross sections, with the open side of the lower portion facing outward, and the open side of the upper portion facing inward. The carriage comprises a platform and a pair of parallel rails with a platform therebetween.

The sliding ramp is connected to the stationary frame by a set of four bearings, two on each side. The rearmost bearing on each side is attached to the stationary rail, and rolls within the sliding ramp's corresponding lower rail portion. The forward bearing is attached to the sliding ramp, and rolls within the stationary frame's corresponding rail. A peg attached to the sliding rail travels inside a channel on a stop plate attached to the stationary rail. The channel has a horizontal portion corresponding to the forward and backward movement of the ramp, and an arced portion corresponding to the rotation of the ramp. When the sliding rail is in any position except its most rearmost, both bearings and the peg hold it in a horizontal position.

When the sliding ramp is in the rearmost position, substantially half of the sliding ramp is over the stationary frame, with the remainder extended beyond the rear of the vehicle. The load's center of mass is slightly beyond the end of the stationary rails. At this position, the peg is below the stop plate channel's arced section, allowing the sliding rails to pivot so that their rear ends are angled towards the ground. The length of the arced section limits the angle of pivot. The forward bearing is positioned under an opening in the top of the stationary rail, allowing it to exit that rail. In this position, only the winch holds the ramp in a horizontal position.

The ramp can also include a weatherproof deck, forcing rain or snow to drain towards the outside of the loading device, rather than allowing it to get inside it.

The carriage is attached to the ramp by a pair of bearings on the carriage's front end which move within an upper section of the sliding rails. The rear of the carriage includes a pair of wheels, and a U-shaped bracket. In the forward position, the bottom of the U-shaped bracket fits within a channel in a corresponding bracket attached to the ramp, holding the rear ends of the ramp and carriage together. The carriage also includes a pair of guide wheels on the front portion, positioned so that they roll along the top of the sliding rails.

The winch and pulley system provides the power to operate the loader. The winch is mounted on the underside of the ramp, near the forward end. From the winch, a cable or rope passes around a first pulley at the ramp's front end. The rope or cable then passes around a second pulley on the carriage's front end. The rope or cable runs back to a third pulley on the carriage's front end, and is attached to a movable support rail attached to the stationary rails at either end by a bearing. The movable support rail moves between a forward position corresponding to the ramp's forward position, and a rearward position corresponding to the ramp's rearward position. A pair of stop plates attached to the stationary rails prevent the movable support from travelling beyond its rearward position.

The winch can, by itself, hold the ramp and carriage in the closed position, but can not prevent the ramp from sliding horizontally along the stationary frame. Therefore, a latch is used to keep the ramp in its forward position. Further, a safety pin passing through the sliding rails and carriage rails, may be used in case the winch's rope breaks.

In use, the safety pins are removed and the above mentioned latches are opened. The ramp is manually slid to the rearward position. The movable support, connected to the ramp by the rope and pulley system, slides with the ramp. The winch is then activated. The winch first allows the ramp to tilt rearward, and then allows the carriage to slide off the ramp and onto the ground. The carriage is now substantially horizontal and close to the ground, allowing the easy loading or unloading of a motorcycle, snowmobile, or other small recreational or utility vehicle. Ideally, the vehicle to be transported will be secured to the carriage with cables or the equivalent. Once loading or unloading is complete, the winch is activated. The winch first pulls the carriage onto the ramp, so that the center of gravity of the carriage and load are slightly rearward of the rear of the stationary beams, and then pulls the ramp into a horizontal position. The ramp is then pushed into its forward position, and all safety latches and safety pins are put in place.

The loading device can be attached to a standard pickup truck by attaching hooks in front which pass around the wall of the bed, behind the cab, and underneath the rear bumper, around the underside of the bed.

Accordingly, it is a principal object of the invention to provide a loading and unloading device which will allow a variety of small recreational and utility vehicles to be carried in the bed on any ordinary pickup truck, without modifying the truck's bed.

It is another object of the invention to provide a loading and unloading device which provides interchangeable vehicle carriages, dump beds, and other load carriers.

It is a further object of the invention to provide a loading and unloading device which can be used in snow or other adverse weather conditions.

Still another object of the invention is to provide a loading/unloading device with components whose range of motion is limited to only that which is necessary to accomplish its purpose, thereby avoiding damage to the loader, the transporting vehicle, and the vehicle to be transported.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings. Mirror image features are designated with a suffix a for the right side of the loading device, and a suffix b for the left side of the loading device.

DETAILED DESCRIPTION OF THE PREFERRED EMBODIMENT

Figure 1:
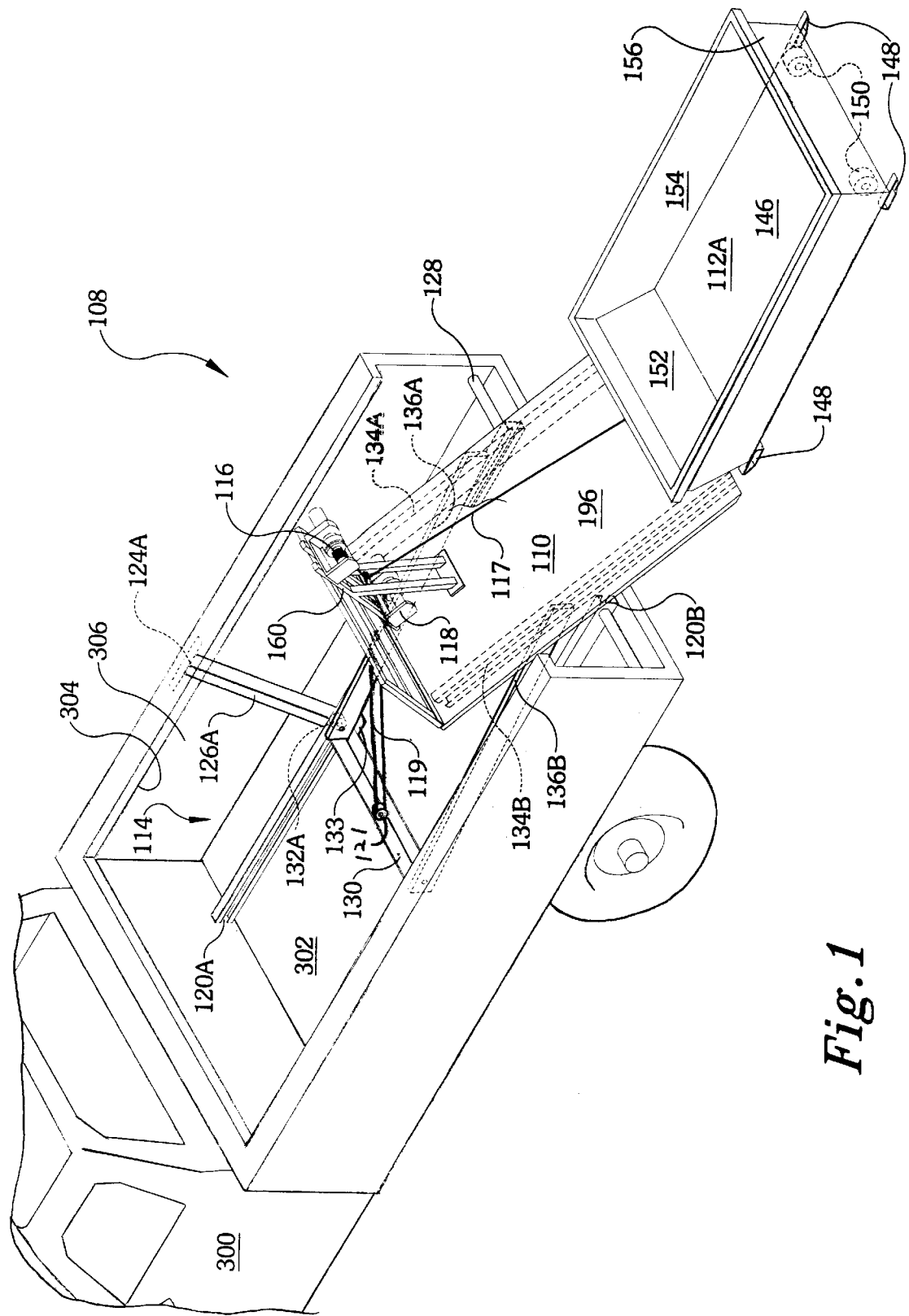
FIG. 1 is an environmental, perspective view of a first embodiment of a device for loading a small motor vehicle onto a pickup truck according to the present invention, showing the carriage fully offloaded.

The present invention is a loading/unloading device for transporting small recreational or utility vehicles, such as motorcycles or snowmobiles, in the bed of a larger vehicle, such as a pickup truck.

The most preferred embodiment is illustrated in FIGS. 1–8 and 17–22. Referring to FIGS. 1–5 and 21, the vehicle loader 108 comprises a ramp 110, an interchangeable carriage 112, and a stationary frame or platform 114, attached to the bed 302 of a truck 300.

The stationary frame 114 comprises a pair of parallel stationary rails, 120a and 120b, each having a C-shaped cross section with the open portion facing inward. A pair of bearings, 122a and 122b, are attached to the rear ends of the stationary rails 120a and 120b. The stationary frame will attach to the bed of a pickup truck using forward braces, 126a and 126b, which include horizontal bearing members 124a,124b fitting below the inner lip 304 of the truck's sidewalls 306, and rear brace 128, fitting within the pivot holes of the truck's tailgate. The use of forward braces 126a,126b and rear brace 128 allows the invention to be installed on a pickup truck without modifying the truck, with the exception of removing the tailgate. The vehicle loader also includes a movable support, 130, connected at each end to stationary rails 120a and 120b by bearings, 132a and 132b, which rolls within the rails, and a pair of stop plates, 133, mounted to the center sections of the stationary rails 120a and 120b.

Figure 6:
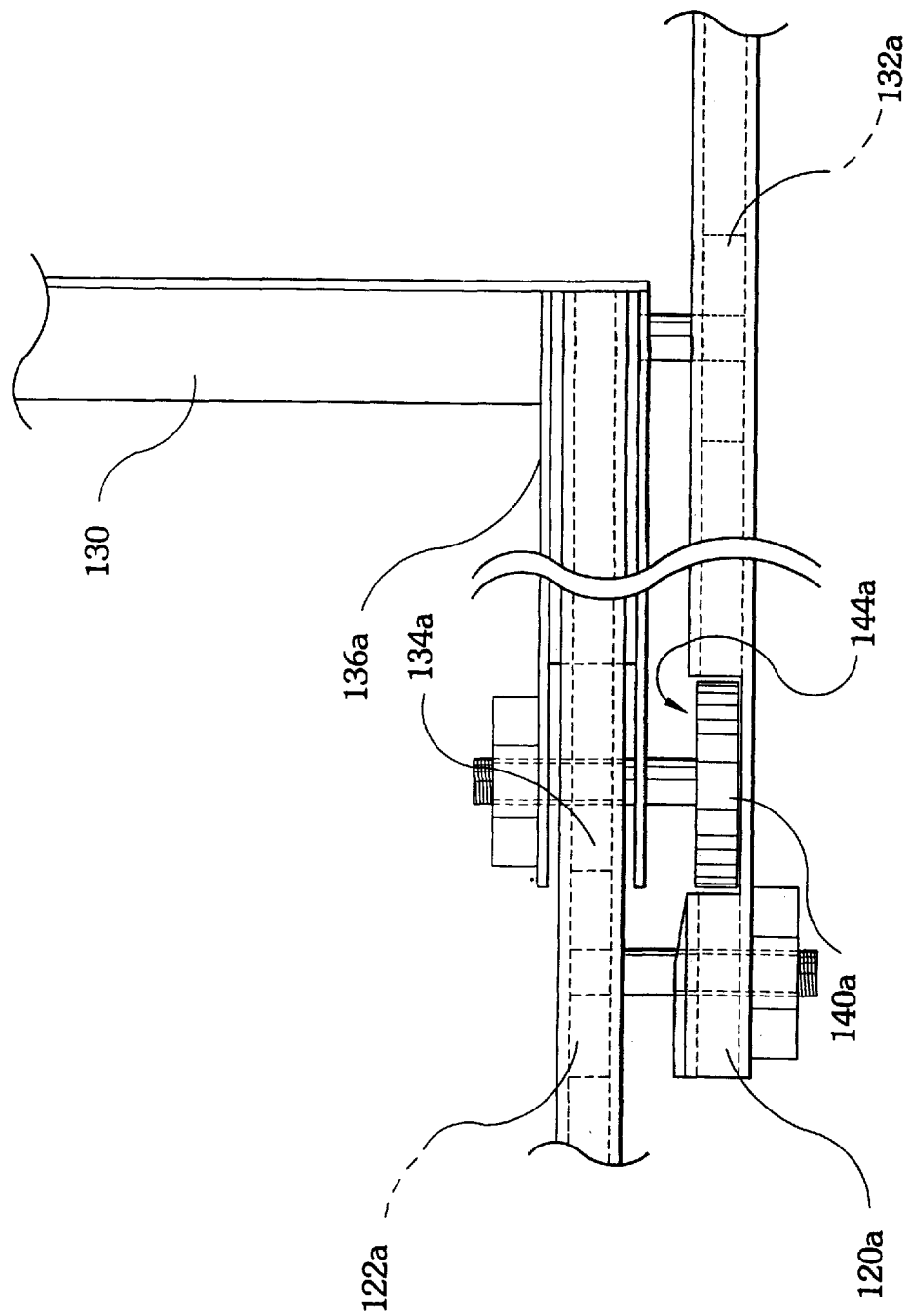
FIG. 6 is a detail top view of the rear end of the stationary rails, lower section of the sliding rails, and swing arm, showing details of the bearings within the rails.
Figure 7:
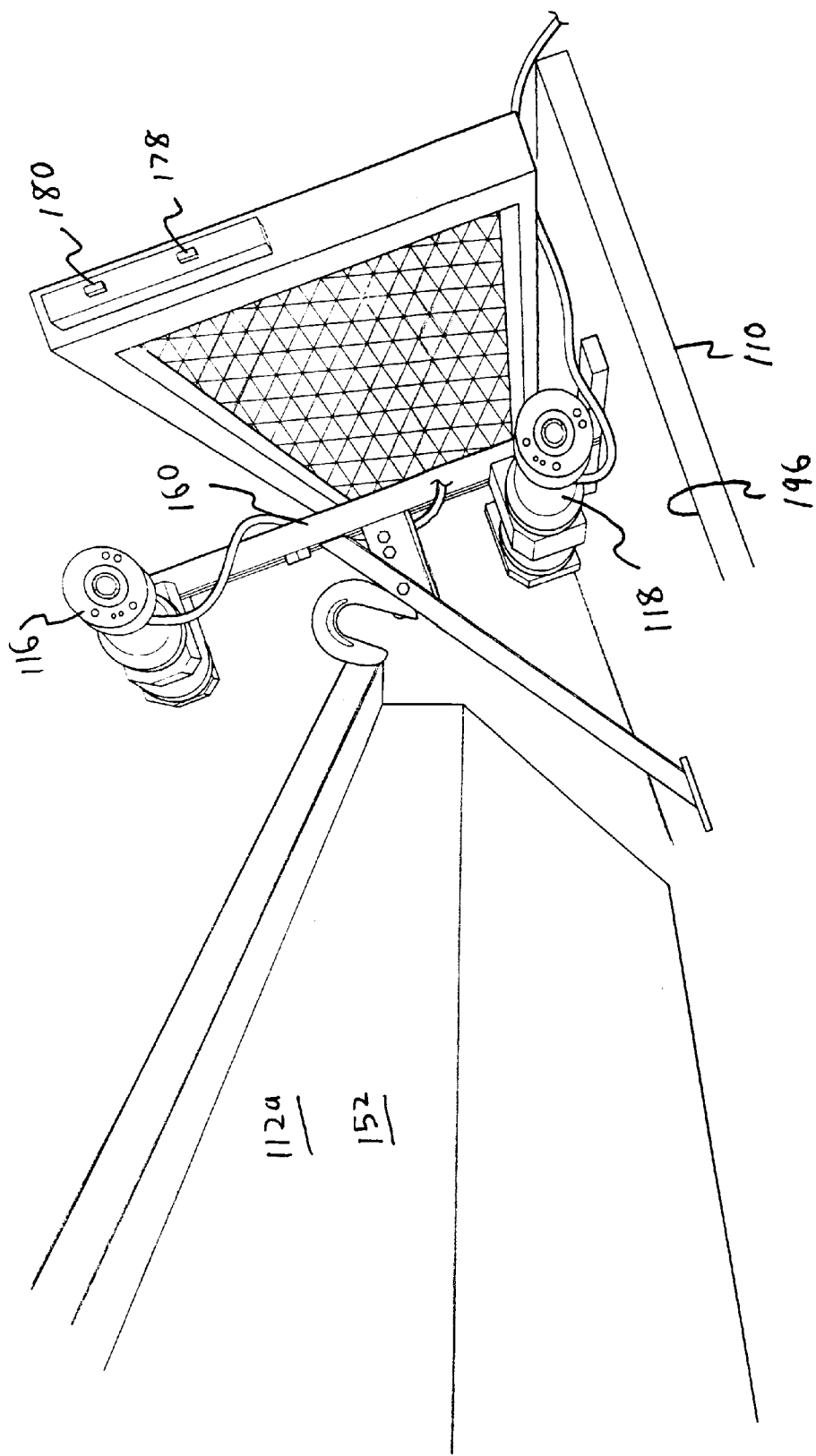
FIG. 7 is a perspective view of the winch support and front of a dump bed type carriage.
Figure 8:
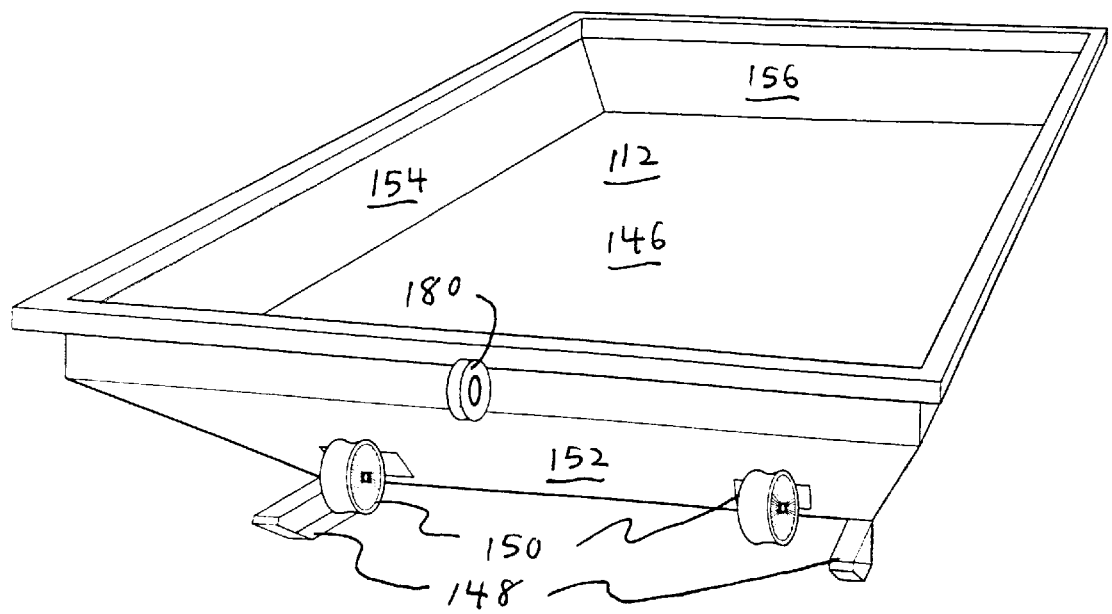
FIG. 8 is a front perspective view of a dump bed type carriage.
Figure 17:
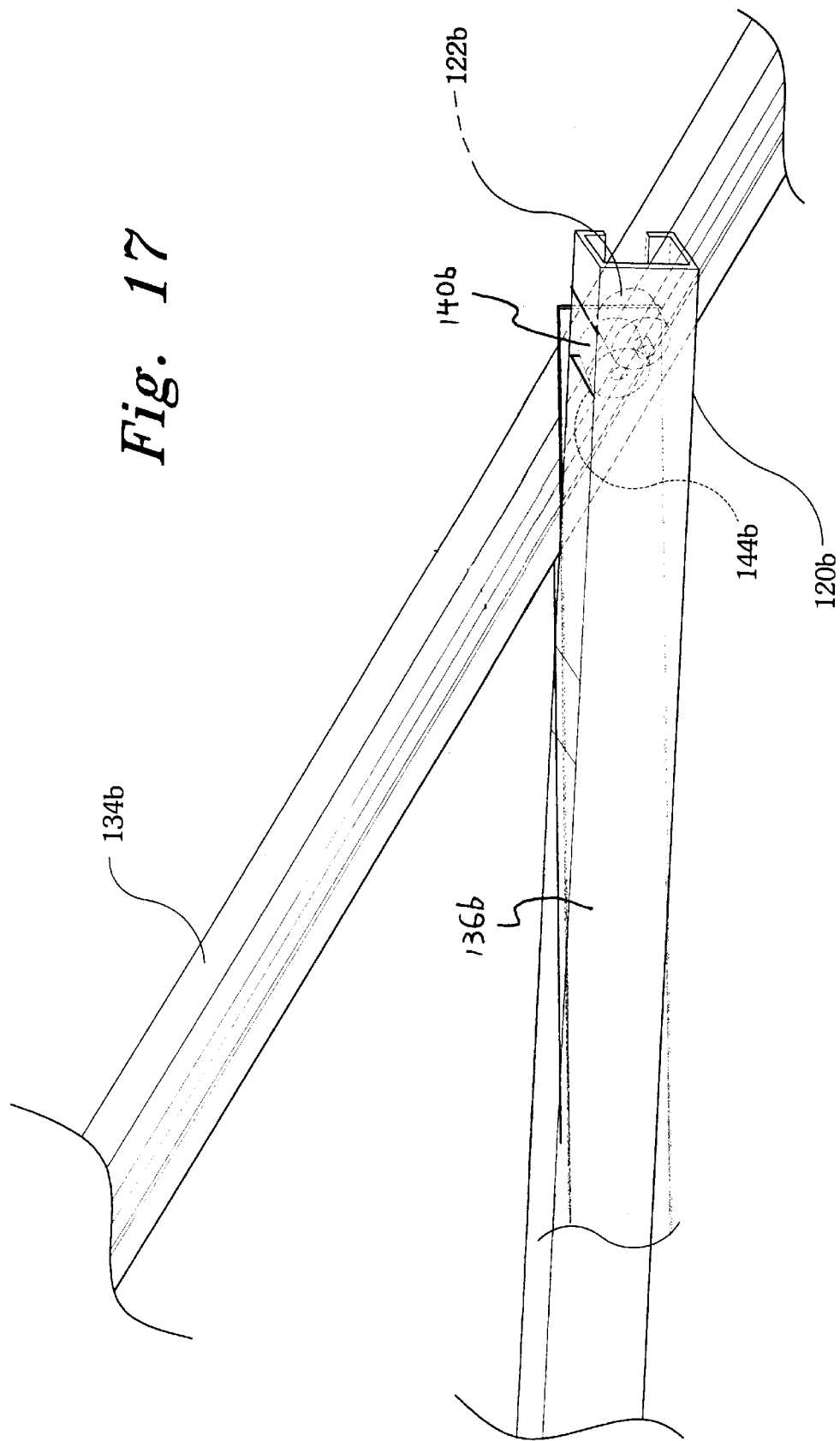
FIG. 17 is a detail perspective view of one frame beam, the corresponding ramp beam, and the corresponding swing arm used within the first embodiment of a vehicle loader according to the present invention.
Figure 18:
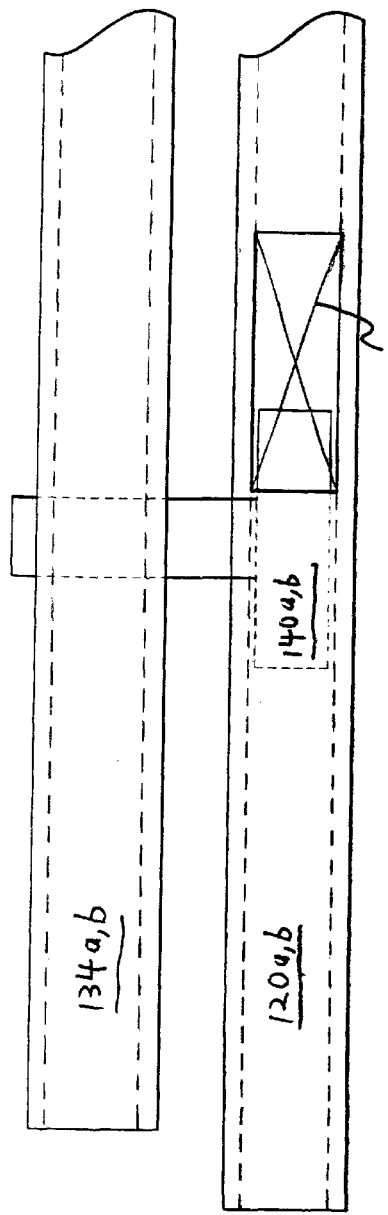
FIG. 18 is top detail view of the front portion of one frame beam and one ramp beam, showing an assembly opening used within the first embodiment of a vehicle loader according to the present invention.
Figure 19:
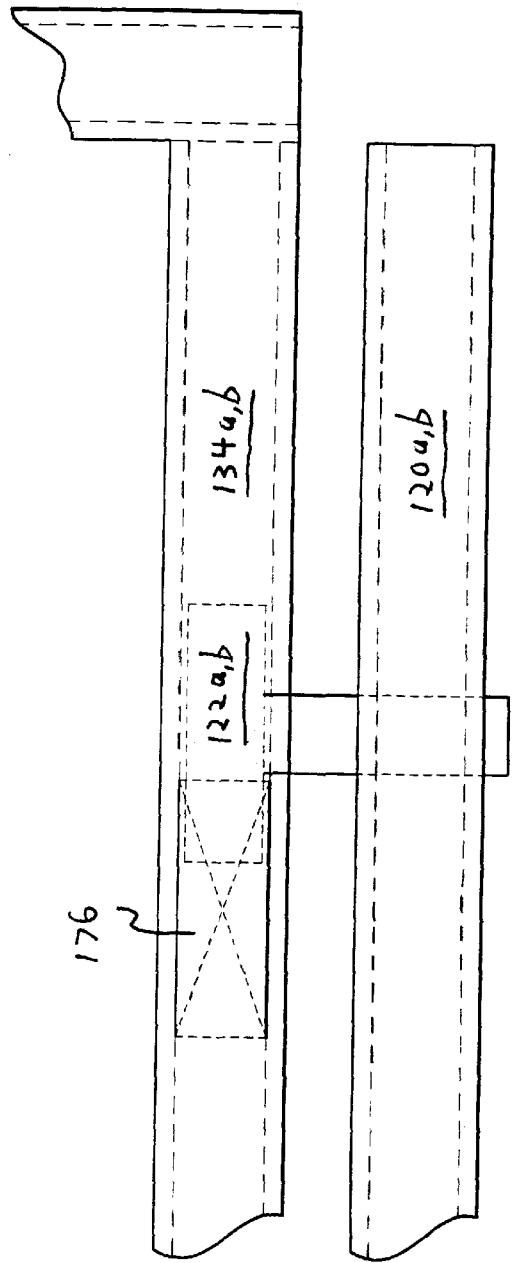
FIG. 19 is top detail view of the rear portion of one frame beam, one ramp beam, and the corresponding swing arm, showing an assembly opening used within the first embodiment of a vehicle loader according to the present invention.

The ramp comprises a pair of parallel rails 134a and 134b, each having a C-shaped cross section, with the open portion facing outward, and a deck 196 across the rails 134a,134b. The bearings 122a and 122b each roll within one of the ramp's rails, 134a or 134b. An additional set of bearings, 140a and 140b, attach to the center sections of the ramp's rails 134a and 134b, and roll within the stationary frame's rails 120a and 120b. Referring to FIGS. 6 and 17, bearings 140a and 140b can exit the stationary rails through openings 144a and 144b in the top of the rear portions of the stationary rails 120a and 120b. A swing arm 136a,136b, having a U-shaped cross section, fits over the front ends of the ramp's beams 134a,134b, and is pivotally mounted to beams 134a, 134b by the bearing 140. The opposite end of swing arm 136a,136b is attached to the bearings 132a,132b of the crossbeam 130. The swing arms 136a,136b thereby limit the degree to which the ramp can pivot. Referring specifically to FIG. 17, the ramp's range of motion is further limited by the bearings 140a,140b, which abut the axles of bearings 122a, 122b, and by the bearings 122a,122b, which abut the axles of bearings 140a,140b, when the ramp 110 has reached its angled position.

Figure 20A:
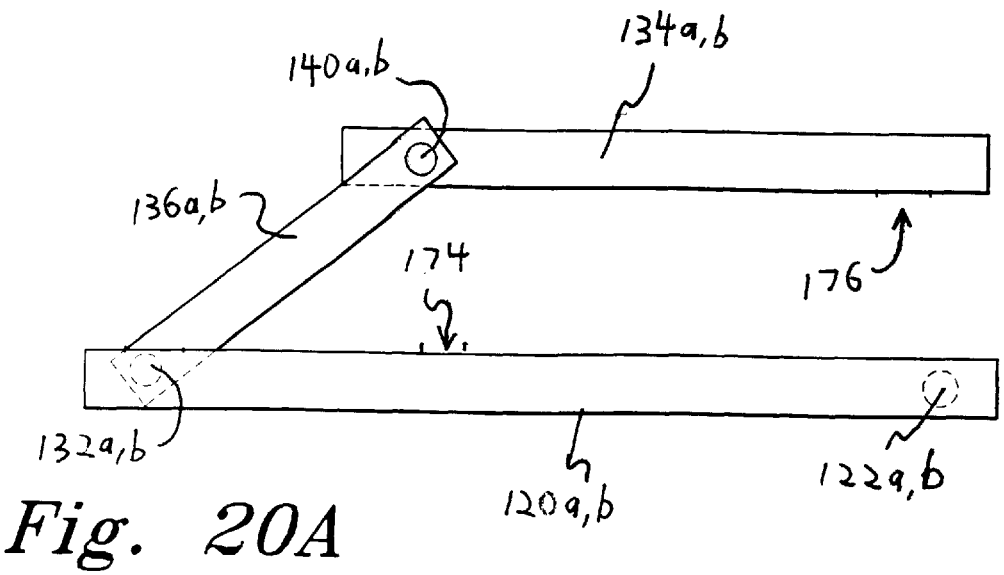
FIGS. 20A–C are each a different diagrammatic side view of one step in the process of attaching the first embodiment's ramp to the frame within the bed of a pickup truck.
Figure 20B:
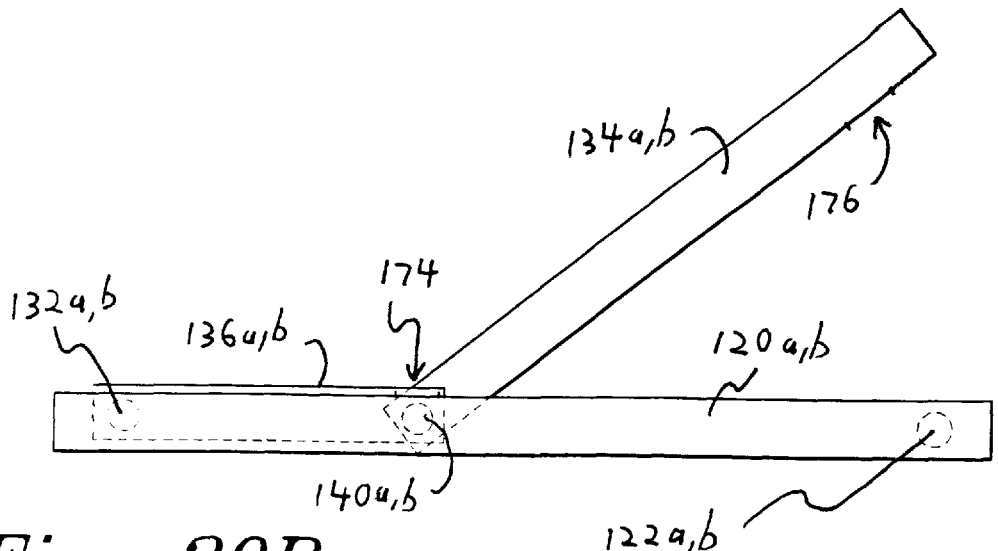
Figure 20C:
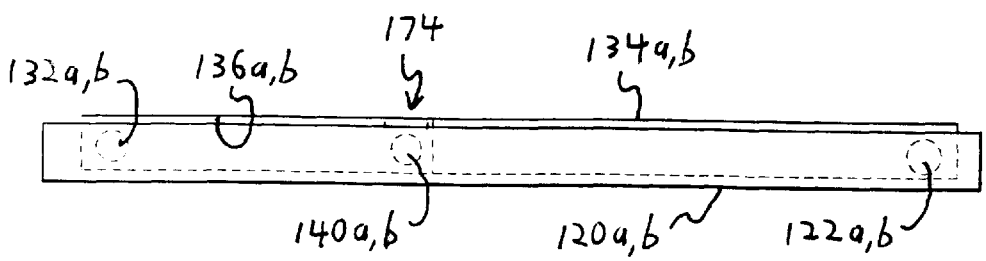

Referring to FIGS. 18–20C, the assembly steps of putting the ramp 110 onto the platform 114 are shown. The rear portion of C-shaped beams 120a,120b includes an assembly opening 174 on their top surfaces, dimensioned and configured to receive the bearings 122a,122b of the ramp's beams 134a,134b. The openings 174 are slightly forward of the ramp's usual forward position. Likewise, C-shaped beams 134a,134b of ramp 110 include assembly openings 176 on their bottom surfaces, dimensioned and configured to receive the bearings 132a,132b of the swing arms 136a,136b and the crossbeam 130, and the bearings 140a,140b of the ramp's C-shaped beams 134a,134b. The openings 176 are slightly rearward of the bearings 140a,140b when the ramp is in it's forward position. Therefore, when the ramp 110 is attached to the platform 114, they can not separate accidently. To attach the ramp 110, The bearings 138a,138b of the swing arms 136a,136b are first inserted through openings 174 (FIG. 20A), followed by the bearings 140a,140b of the beams 134a,134b (FIG. 20B). The ramp 110 is then moved forward so that the openings 176 in the ramp's beams 134a,134b align with and fit over the bearings 122a,122b of the platform's beams 120a,120b (FIG. 20C).

Figure 2:
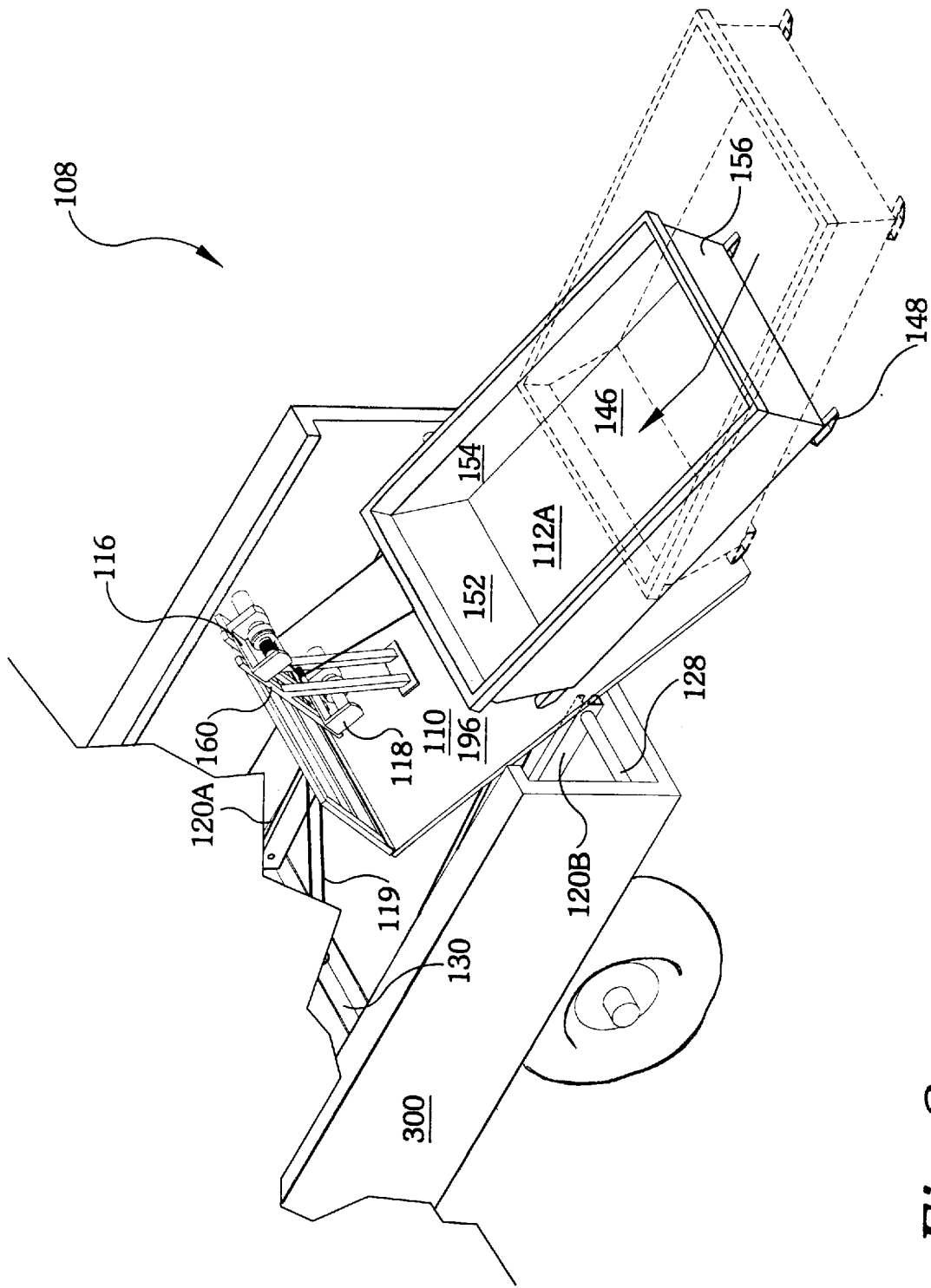
FIG. 2 is an environmental, perspective view of a first embodiment of a device for loading a small motor vehicle onto a pickup truck according to the present invention, showing the carriage partially offloaded.
Figure 3:
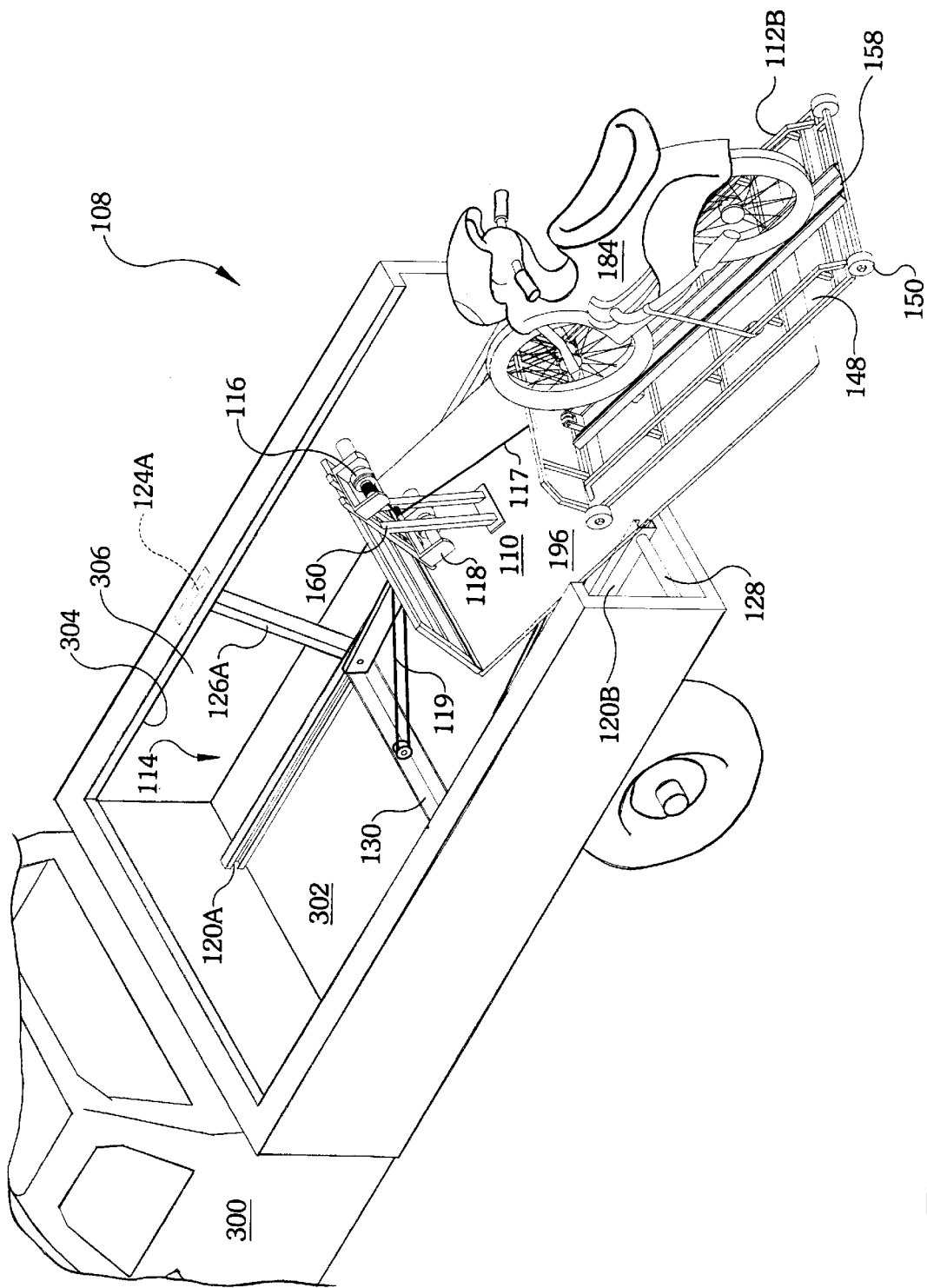
FIG. 3 is an environmental, perspective view of a first embodiment of a device for loading a small motor vehicle onto a pickup truck according to the present invention, showing a substituted carriage.

The interchangeable carriage 112 may take any of several different configurations, best seen in FIGS. 1–5 and 7–8. Illustrated herein is a carriage 112 in the configuration of a dump bed 112a (FIG. 1) and a motorcycle carriage 112b (FIG. 3). A snowmobile carriage is another suggested configuration. The carriage 112 includes a platform 146, winch connection 180, and preferably includes a runner 148 and/or wheel 150 at each corner. Wheels 150 serve to reduce friction during loading and unloading, and runners 148 fit on either side of ramp 110 to act as guides. A dump bed 112a preferably includes front wall 152, side walls 154, and rear gate 156. A motorcycle loader 112b preferably defines trough 158, extending from front to rear, and being dimensioned and configured to receive the wheels of a motorcycle.

The operation of the loading device is controlled primarily by a pair of winches. The top of ramp 110 includes winch support 160. The movement of the carriage are controlled by an upper winch 116, located at the top of winch support 160, and controlled by lower switch 178, and the movement of the ramp is controlled by a lower winch 118, located in deck 196 below winch support 160 and controlled by upper switch 180. The cable 119 of lower winch 118 extends around pulley 121 on the crossbeam 130, and extends back to the ramp 110, connecting to the ramp 110 near the winch 118. When the winch is fully wound, the ramp 110 and crossbeam 130 move horizontally within platform 114 as a single unit. Extending cable 119 raises the front end of ramp 110, thereby extending and lowering the rear end of ramp 110. The cable 117 of upper winch 116 may be connected either to carriage 112, so that operating of the upper winch 116 lowers the carriage 112. Alternatively, a securing pin may be pushed through corresponding holes in the winch support and carriage to secure the carriage 112 in place (not shown, and well known) and the cable 117 connected to the load or vehicle within the carriage, thereby directly lowering the transported vehicle.

Figure 21:
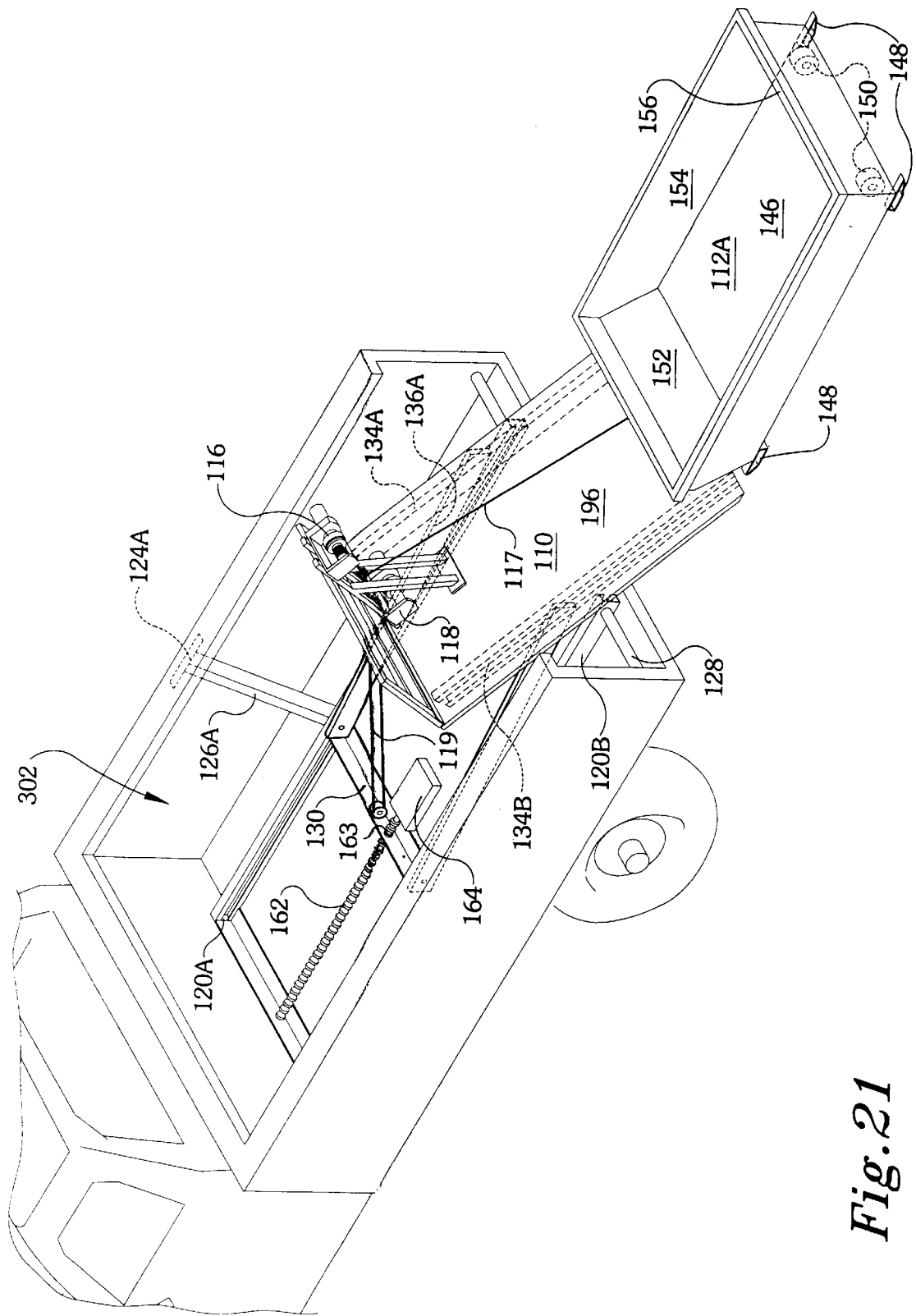
FIG. 21 is an environmental, perspective view of a first embodiment of a device for loading a small motor vehicle onto a pickup truck according to the present invention, showing a motorized threaded rod drive system for the horizontal extension of the ramp.
Figure 22:
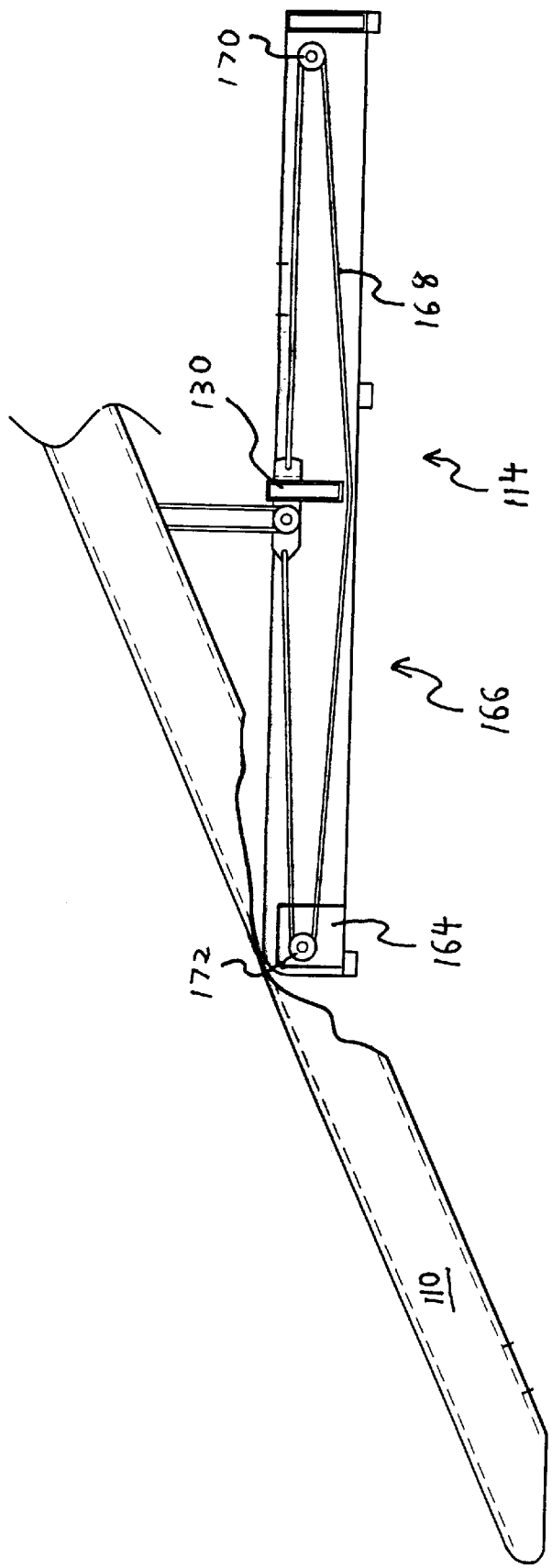
FIG. 22 is an environmental, perspective view of a first embodiment of a device for loading a small motor vehicle onto a pickup truck according to the present invention, showing a motorized chain and sprocket drive system for the horizontal extension of the ramp.

Referring to FIGS. 21–22, the horizontal movement of the ramp 110 within the platform 114 may be controlled manually, by a threaded rod 162 powered by a motor 164, or by a chain and sprocket drive 166 powered by a motor 164. If a threaded rod 162 is used, it will extend from the front end of truck bed 302 to the opposite travel extreme of crossbeam 130, located centrally in the truck bed 302. The threaded rod 162 passes through an internally threaded nut 163 in crossbeam 130, so that the rotation of the rod, powered by motor 164, pushes the crossbeam 130 in the desired direction. Alternatively, a chain 168 may extend from crossbeam 130 to a forward sprocket 170, back along the truck bed to a rearward sprocket 172, and back to the crossbeam 130. Both ends of the chain 168 are attached to the crossbeam 130. When the motor 166 drives one of the sprockets 170,172 (sprocket 172 is illustrated connected to the motor 166), the crossbeam 130 is pushed in the desired direction. If a motorized drive system is used to move the ramp 110 horizontally, this system will be sufficient to hold the ramp in place while driving. Otherwise, securing pins (not shown, and well-known) may be used to secure the ramp within the bed 302 of pickup truck 300.

Figure 4:
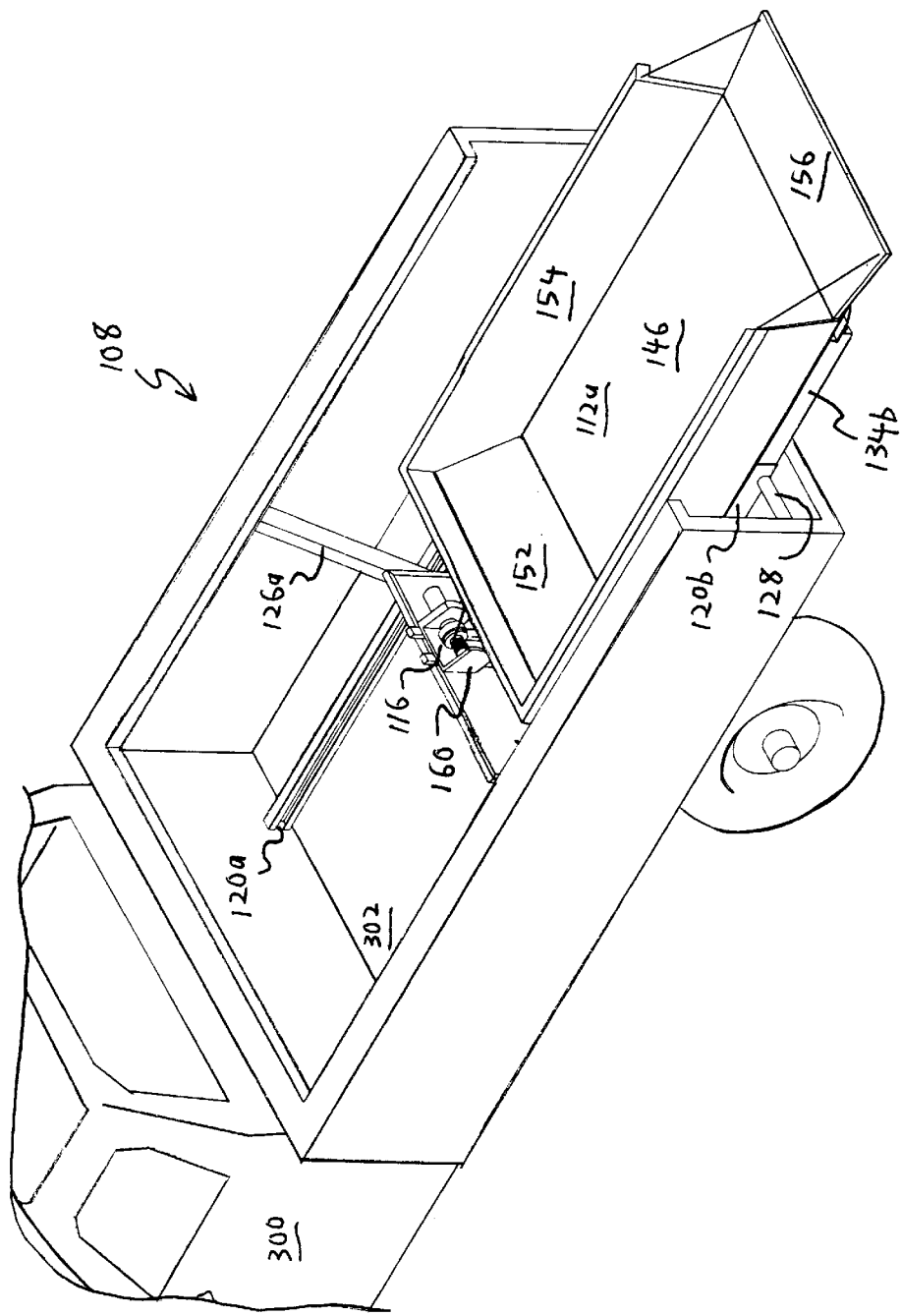
FIG. 4 is an environmental, perspective view of a first embodiment of a device for loading a small motor vehicle onto a pickup truck according to the present invention, showing the ramp horizontally extended and elevated.
Figure 5:
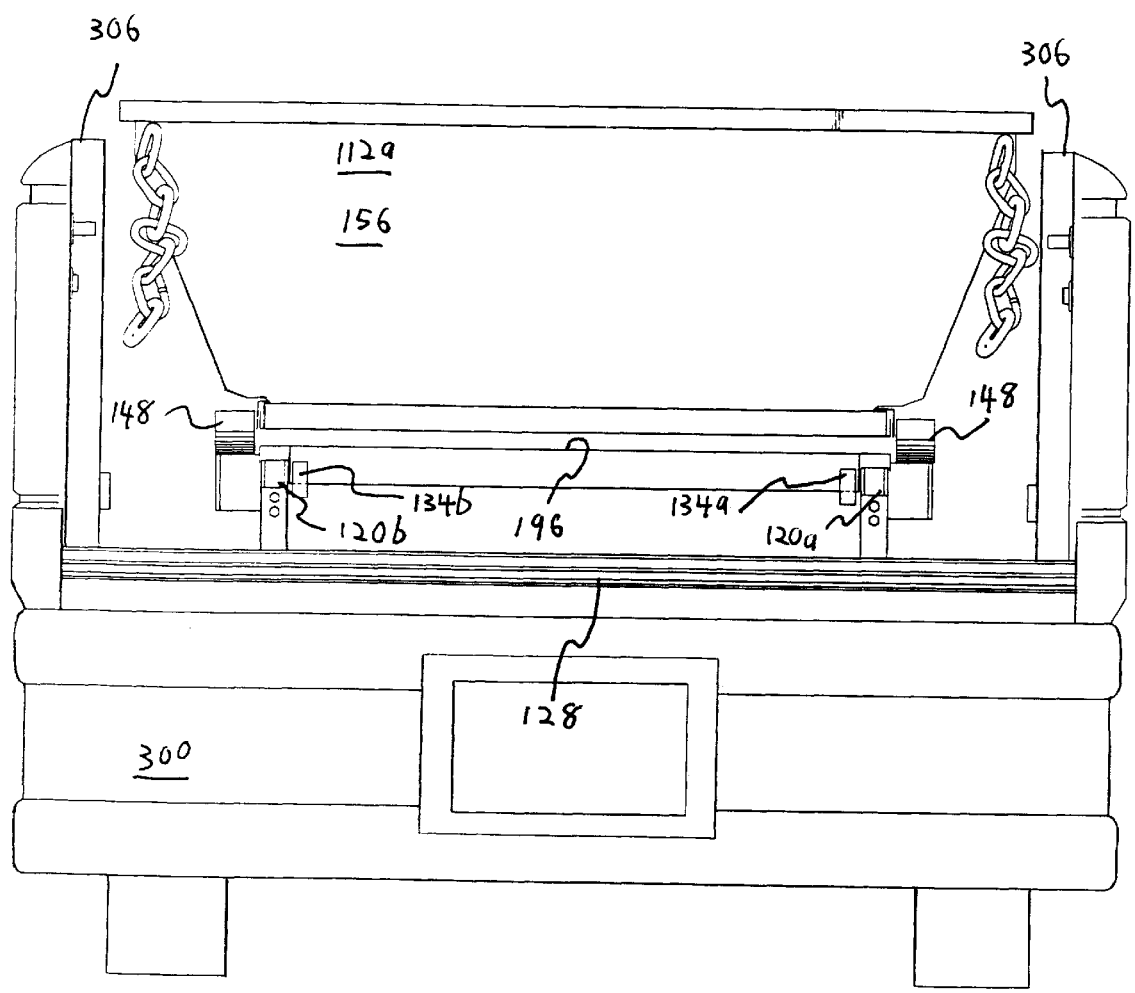
FIG. 5 is an end view of the first embodiment of a vehicle loader of the present invention in the closed position, looking from the rear towards the front of the invention.

Operation of the loading device 108 is best illustrated in FIGS. 1–5 and 21–22. Beginning with the loading device in the fully closed position illustrated in FIG. 5, the ramp 110 is first extended horizontally either manually, or using a motor driven threaded rod 162 or chain and sprocket drive 166 as explained above. The resulting configuration is illustrated in FIG. 4. The lower winch 118 is then extended to angle the ramp 110, bringing it in contact with the ground. If the user wishes to dump a load, such as firewood, onto the ground, he may open the carriage's gate 156 prior to angling the ramp 110. The resulting configuration is illustrated in FIG. 3. FIG. 3 illustrates a motorcycle carriage, whereas the remaining figures showing the preferred embodiment illustrate a dump bed. The procedure illustrated in FIGS. 1–5 works equally well with either. Next, the winch 116 is extended, lowering carriage 112 to the ground. Alternatively, winch 116 may be connected to a vehicle or other load within carriage 112, and the vehicle lowered while the carriage remains stationary. The resulting configuration is illustrated in transition in FIG. 2 and at completion in FIG. 1. The vehicle or other load may be removed from carriage 112 with the carriage at ground level, making it easy to merely roll motorcycle 284 off the carriage.

To load a vehicle or other load, the load is first placed on carriage 112 while carriage 112 is sitting on the ground (or alternatively connected to winch 116 with the carriage 112 secured on ramp 110) (FIG. 1). The winch 116 is operated to raise the carriage 112 (or the load) onto the ramp 110. If the runners 148 are positioned imperfectly, as illustrated in FIG. 2, the winch 116 will still be able to raise the carriage 112, and the user may manually adjust the carriage position so that the runners 148 are on either side of ramp 110 by taking advantage of the reduced coefficient of kinetic friction as compared to static friction while the carriage 112 is being raised, resulting in the position shown in FIG. 5. When the carriage is completely raised (FIG. 3), winch 118 is operated to pull the ramp 110 into a horizontal position (FIG. 4). The crossbeam 130 and ramp 110 are then pushed forward into the truck bed 302 either manually or using a motorized drive.

Figure 9:
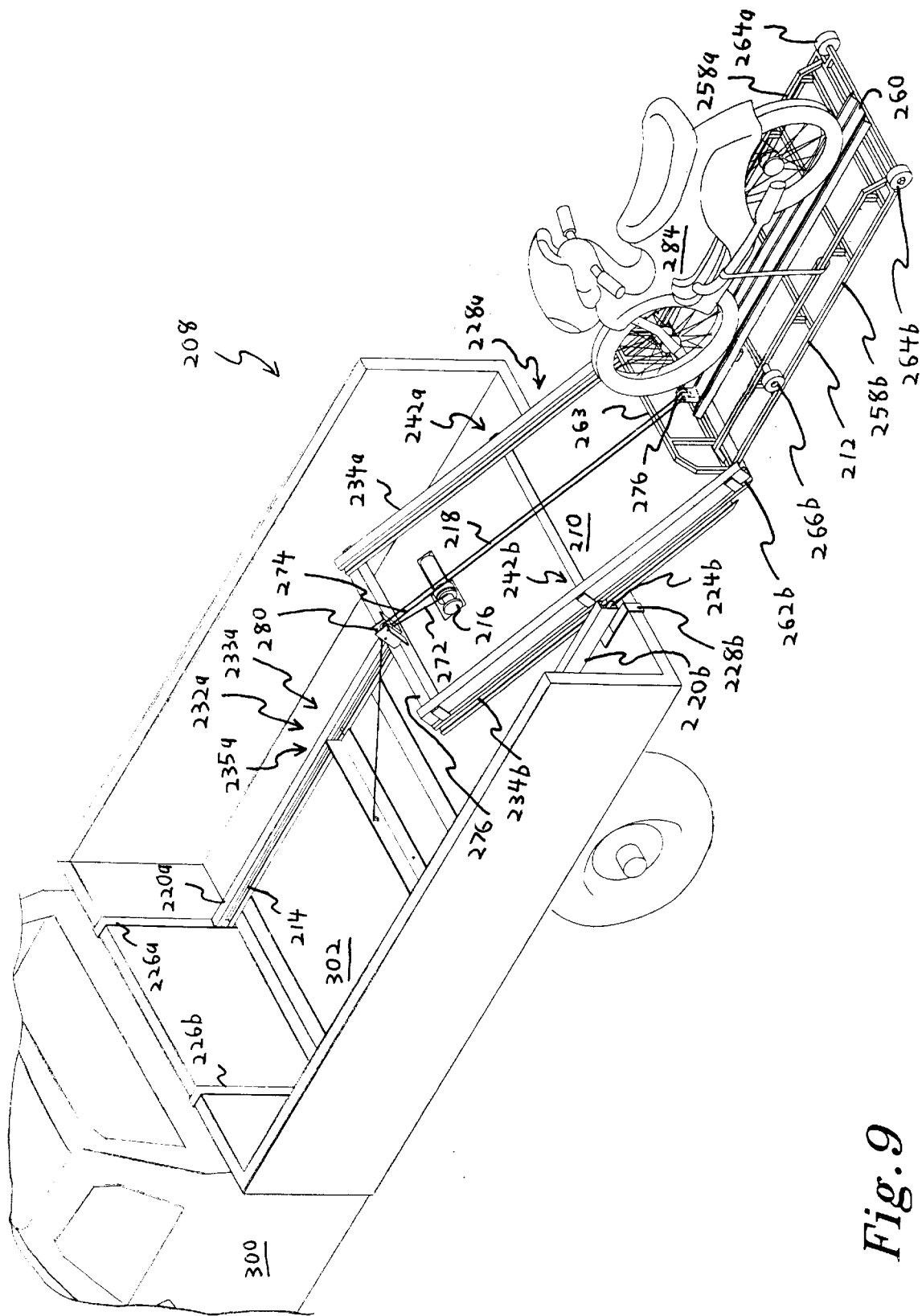
FIG. 9 is an environmental, perspective view of a second embodiment of a device for loading a small motor vehicle onto a pickup truck according to the present invention.
Figure 10:
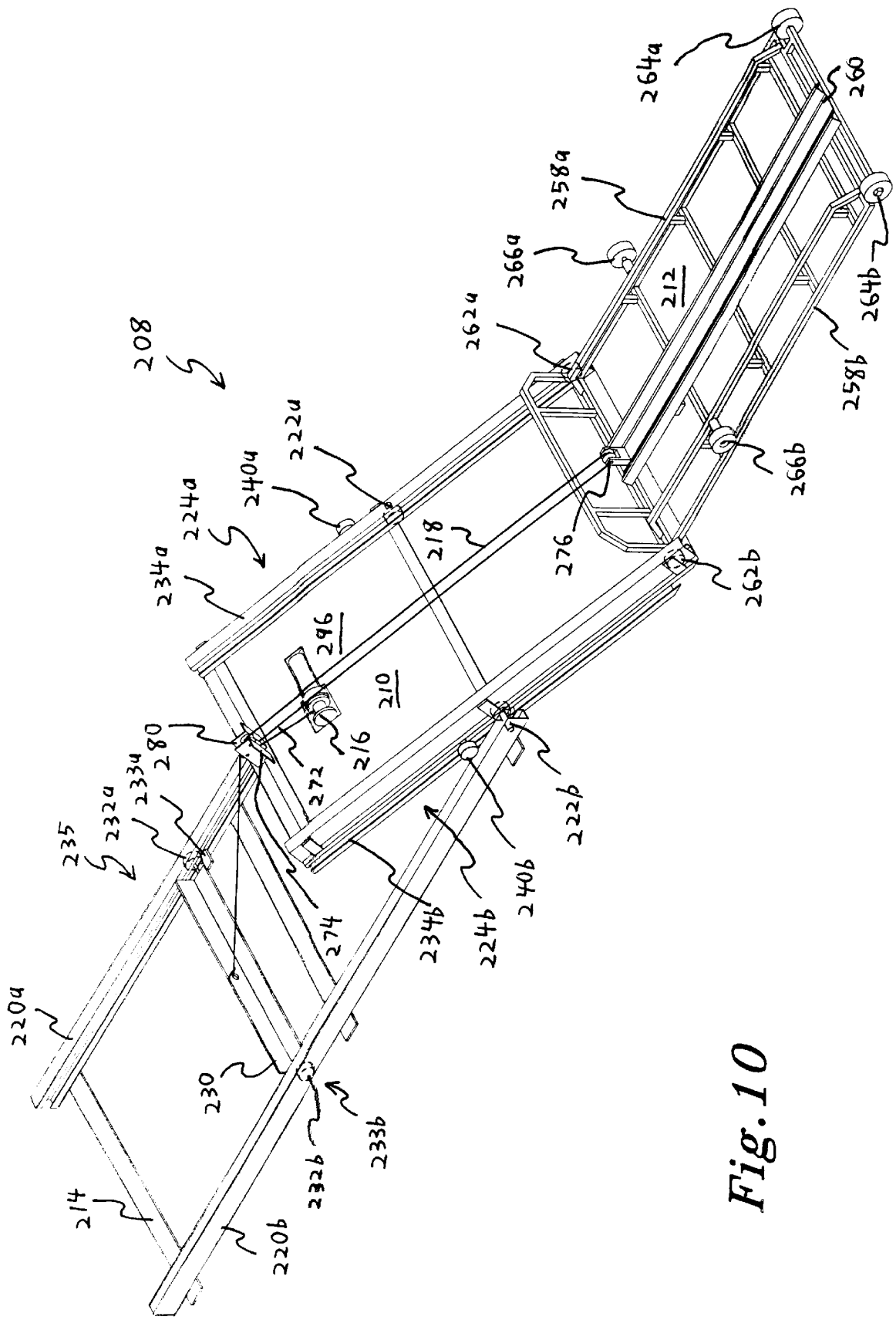
FIG. 10 is a perspective view of a second embodiment of a device for loading a small motor vehicle onto a pickup truck according to the present invention.

A second embodiment is illustrated in FIGS. 9–15. Referring to FIGS. 9 and 10, the loading/unloading device 208 comprises a ramp, 210, and carriage, 212, pivotally and slidably connected to each other and to a stationary frame, 214, attached to the bed 302 of a truck 300. A winch, 216, works in conjunction with a rope and pulley system, 218, to extend and close the invention. It is to be understood that when referring to the term "rope" herein, the term includes cables and any other line suitable for use with a pulley system.

Figure 11:
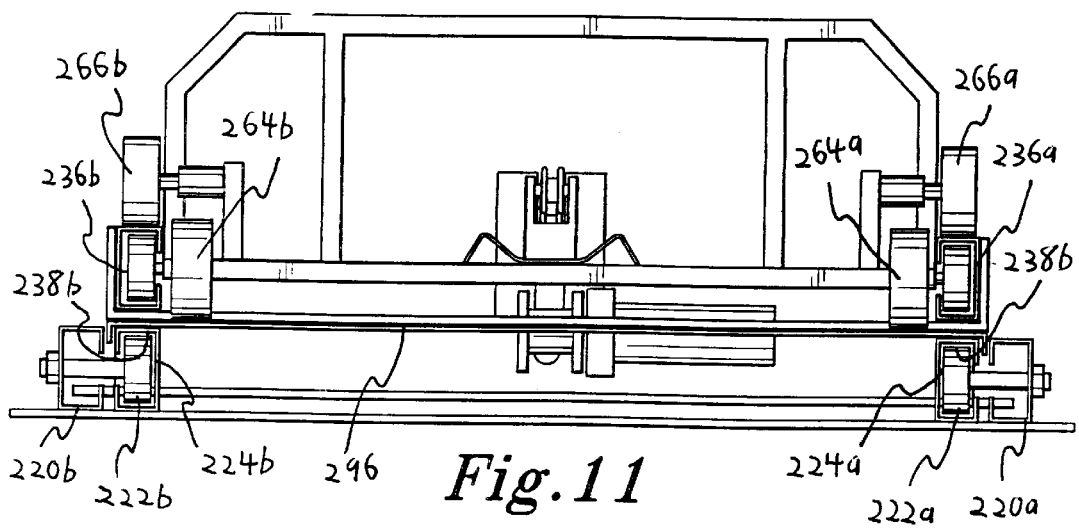
FIG. 11 is an end view of a second embodiment of the invention in the closed position, looking from the rear towards the front of the invention.
Figure 14A:
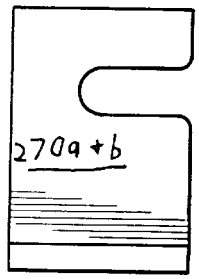
FIG. 14A is a detail side view of the safety latch positioned on the rear end of the sliding rails of the invention's second embodiment.
Figure 13A:
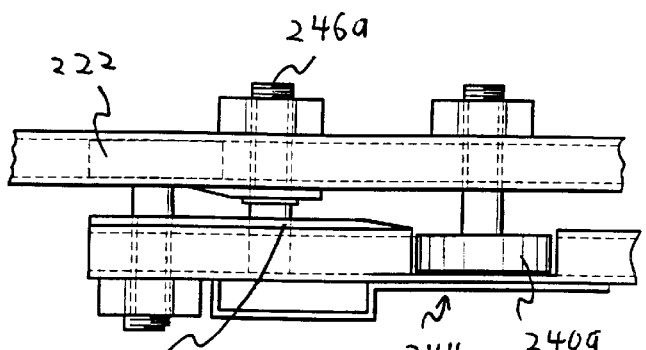
FIG. 13A is a detail top view of the rear end of the stationary rails and lower section of the sliding rails of the invention's second embodiment, showing details of the bearings, pin, and stop plate.
Figure 14B:
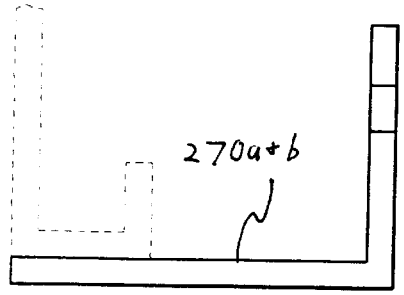
FIG. 14B is a detail end view of the safety latch positioned on the rear end of the sliding rails of the invention's second embodiment.
Figure 13B:
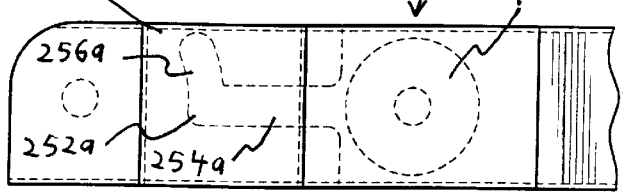
FIG. 13B is a partial side view of the rear end of the stationary rails and lower section of the sliding rails of the invention's second embodiment, showing details of the bearings, pin, and stop plate.
Figure 15B:
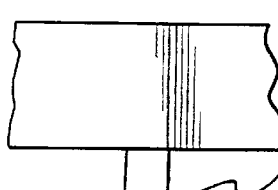
FIG. 15B is a detail side view of the U-shaped pin located on the rear end of the carriage, corresponding to the latch in FIGS. 14A–B.
Figure 15A:
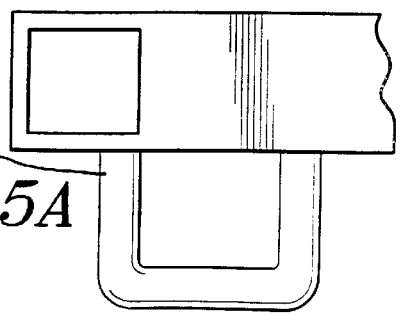
FIG. 15A is a detail end view of the U-shaped pin located on the rear end of the carriage, corresponding to the latch in FIGS. 14A–B.
Figure 12A:
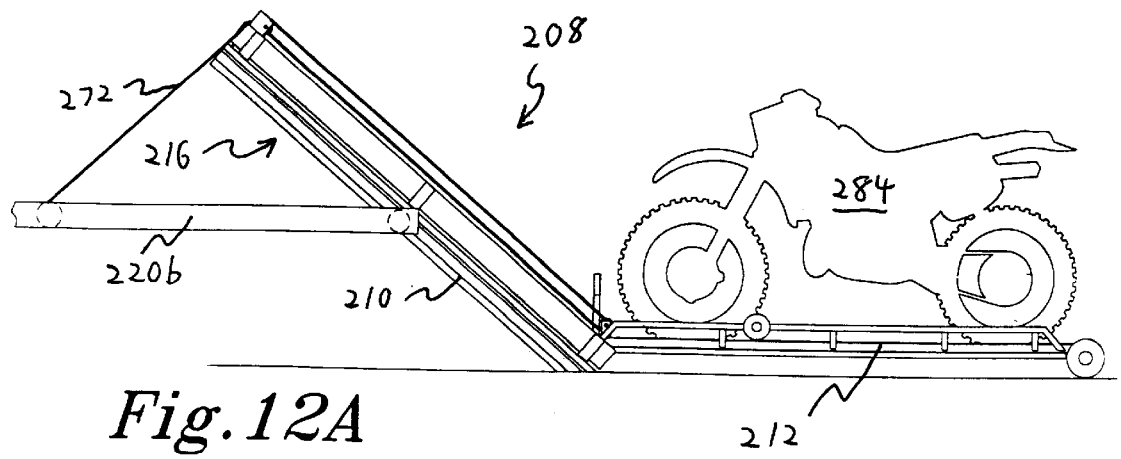
FIGS. 12A–E are each a diagrammatic side view of a different state each corresponding to a step in the procedure for loading a motorcycle onto a pickup truck using the second embodiment of the invention.
Figure 12B:
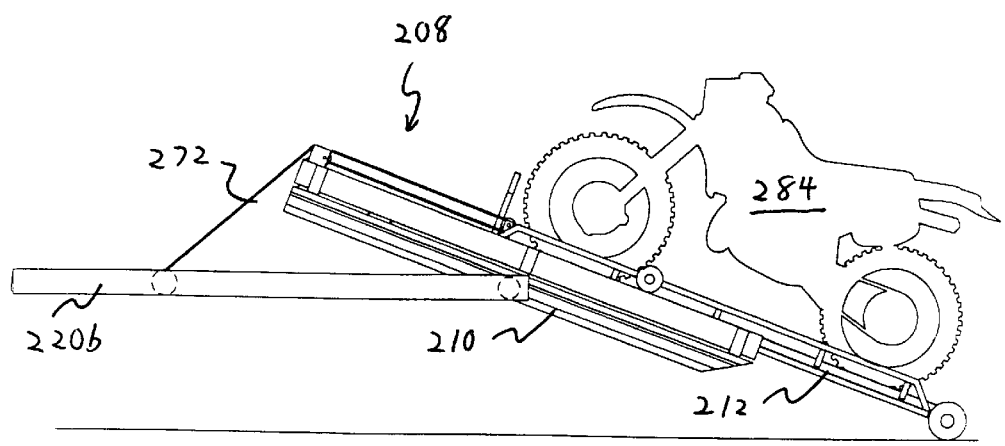
Figure 12C:
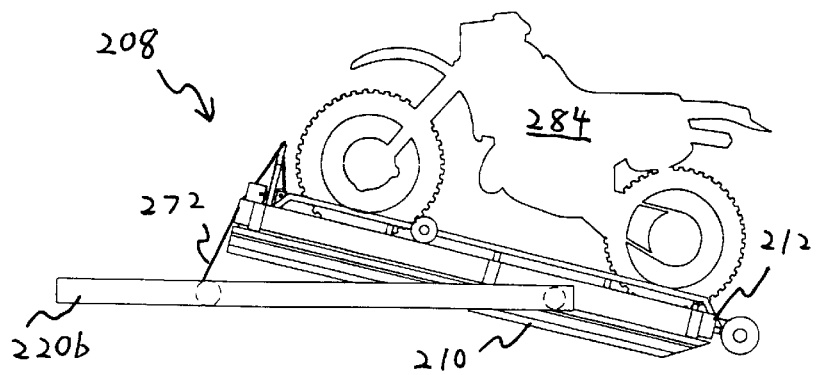
Figure 12D:
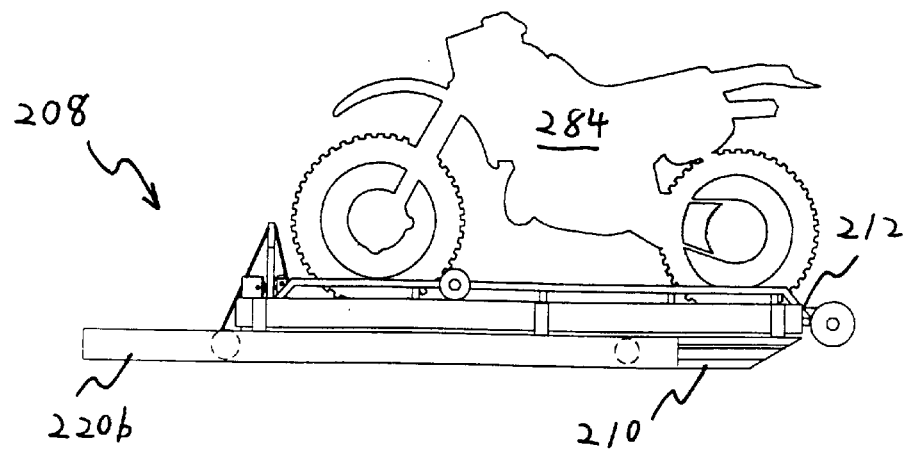
Figure 12E:
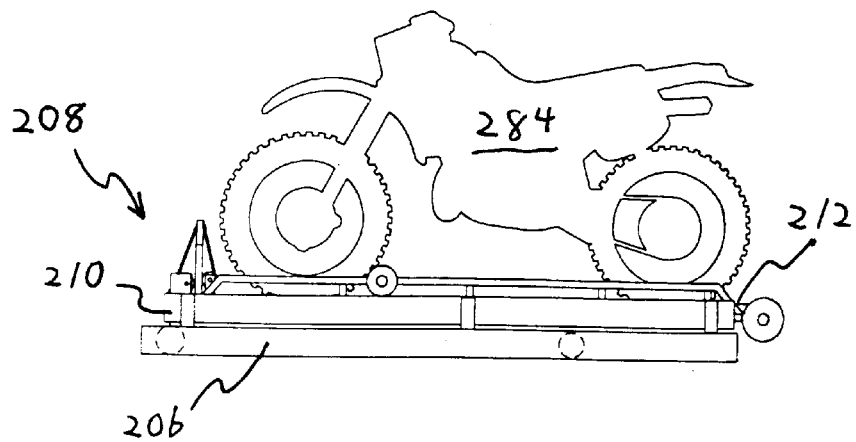

The stationary frame 214 comprises a pair of parallel rails, 220a and 220b, each having a C-shaped cross section with the open portion facing inward. The cross section is best seen in FIG. 11. Referring to FIGS. 13A and 13B, which illustrate the right side of the invention, and FIG. 10, which shows the location of the elements detailed in FIGS. 13A and 13B, a pair of bearings, 222a and 222b, are attached to the rear ends, 224a and 224b, of the stationary rails 220a and 220b. Referring back to FIGS. 9 and 10, in the second embodiment the stationary frame will attach to the bed of a pickup truck using front hooks, 226a and 226b, which attach between the front of the bed and rear of the cab, and rear hooks, 228a and 228b, which hook between the rear bumper and the truck bed. The use of hooks 226a, 226b, 228a, and 228b allow the invention to be installed on a pickup truck without modifying the truck, with the exception of removing the tailgate. Ideally, the second embodiment will also include a movable support, 230, connected at each end to stationary rails 220a and 220b by bearings, 232a and 232b, which rolls within the rails, and a pair of stop plates, 233a and 233b, mounted to the center sections, 235a and 235b, of the stationary rails 220a and 220b.

The ramp comprises a pair of parallel rails, 234a and 234b, each having an upper section, 236a and 236b, and a lower section, 238a and 238b. Referring to FIG. 11, the upper sections 236a and 236b, and lower sections 238a and 238b, each have a C-shaped cross section, with the open portion facing outward on the lower section 238a and 238b, and inward on the upper section 236a and 236b. The bearings 222a and 222b each roll within one lower section, 238a or 238b, of the ramp's rails, 234a or 234b. An additional set of bearings, 240a and 240b, attach to the center sections, 242a and 242b, of the ramp's rails 234a and 234b, and roll within the stationary frame's rails 220a and 220b. Referring to FIGS. 13A, 13B, and 10, bearings 240a and 240b can exit the stationary rails through openings 244a and 244b in the top of the rear portions, 224a and 224b, of the stationary rails 220a and 220b. A pair of pegs, 246a and 246b, are attached to the center portions, 242a and 242b, of the ramp's rails 234a and 234b between the bearings 232a and 232b, and the bearings 240a and 240b, travel within a pair of stop plates, 250a and 250b, mounted on the rear portion, 224a and 224b, of the stationary rails. The stop plates 250a and 250b each have a channel, 252a and 252b, corresponding to pegs 246a and 246b, having a horizontal section 254a and 254b, and an arced section 256a and 256b. The pegs 246a and 246b, and the stop plates 250a and 250b, serve to prevent rotation of the ramp 210 in any position except the rearmost position, limit rotation of the ramp 210 to a maximum angle, and prevent horizontal sliding of the ramp 210 when rotated out of a horizontal position.

Referring back to FIGS. 9 and 10, the carriage comprises a pair of parallel rails, 258a and 258b, with a platform, 260, therebetween. A pair of bearings, 262a and 262b, are attached to the front, 263, of the carriage 212, and roll within the ramp beams' upper sections 236a and 236b. The ramp's rear end includes a pair of wheels, 264a and 2G4b. A pair of guide wheels, 266a and 266b, are mounted on the forward portion of the ramp. Referring to FIGS. 14A, 14B, 15A, and 15B, a pair of U-shaped pins, 268a and 268b, mounted on the rear of the carriage, correspond to a pair of latches, 270a and 270b, mounted on the end of the ramp.

Referring back to FIGS. 9 and 10, the winch 216 is mounted on the forward portion of the ramp 210. The rope or cable 272, beginning at winch 216, passes around pulley 274 at the front end, 276, of ramp 210, goes around pulley 278 at the front end 262 of carriage 212, goes around pulley 280 at the front end 276 of the ramp 210, and is affixed at the movable support 230.

Although the winch 216 is capable of holding the ramp 210 and carriage 212 in the closed position, it can not prevent the ramp from sliding horizontally on the stationary frame 214. Furthermore, it is desirable to minimize the risk that the rope or cable 272 will break during transportation. Therefore, the preferred embodiment includes a safety pin passing through holes in the carriage and ramp to hold the carriage in place, and a latch holding the ramp in place on the stationary rails.

As can be seen in FIG. 11, it would be very difficult for rain or snow to get inside the invention. The ramp's weatherproof deck, 296, forces precipitation to drain around the outside of the invention, rather than towards the inside.

FIG. 12 shows the process of loading a motorcycle, 284, onto a truck using the invention. The process begins with the ramp 210 angled towards the ground, and the carriage 212 substantially horizontal and close to the ground. In this position, the bearings 232a and 232b are outside stationary rails 220a and 220b, and the pegs 246a and 246b are at the end of the arced portion of the stop plate channels, 256a and 256b. The movable support 230 is at its rearmost position, against stop plates 235a and 235b. The motorcycle 284 is placed on the carriage 212, as in FIG. 12A. Preferably, the motorcycle 284 is strapped to the carriage 212 with cables or the equivalent. The winch 216 is activated, pulling the carriage 212 up the ramp 210, as in FIG. 12B. The ramp 210 begins to rotate towards a horizontal position until the ramp 210 and carriage 212 are parallel, at which point the guide wheels 266a and 266b begin to roll along the top of the ramp beams. As the carriage 210 is raised off the ground, tension in the rope or cable 272 holds the ramp 210 and carriage 212 at the same angle. The carriage 212 reaches its maximum forward position with respect to the ramp 210 with the center of gravity 286 of motorcycle 284 slightly rearward of the end of the stationary rails. In this position, the pins 268a and 268b have entered latches 270a and 270b, locking the rear of the ramp 210 and carriage 212 together. At this point, continued operation of the winch 216 pulls the ramp 210 into a horizontal position, in which the front of ramp 210 is aligned with the movable support 230. From here, the user can easily push the ramp 210 into the truck to its forward position on the stationary rails 220a and 220b, taking with the ramp 210 the carriage 212 and movable support 230.

Figure 16:
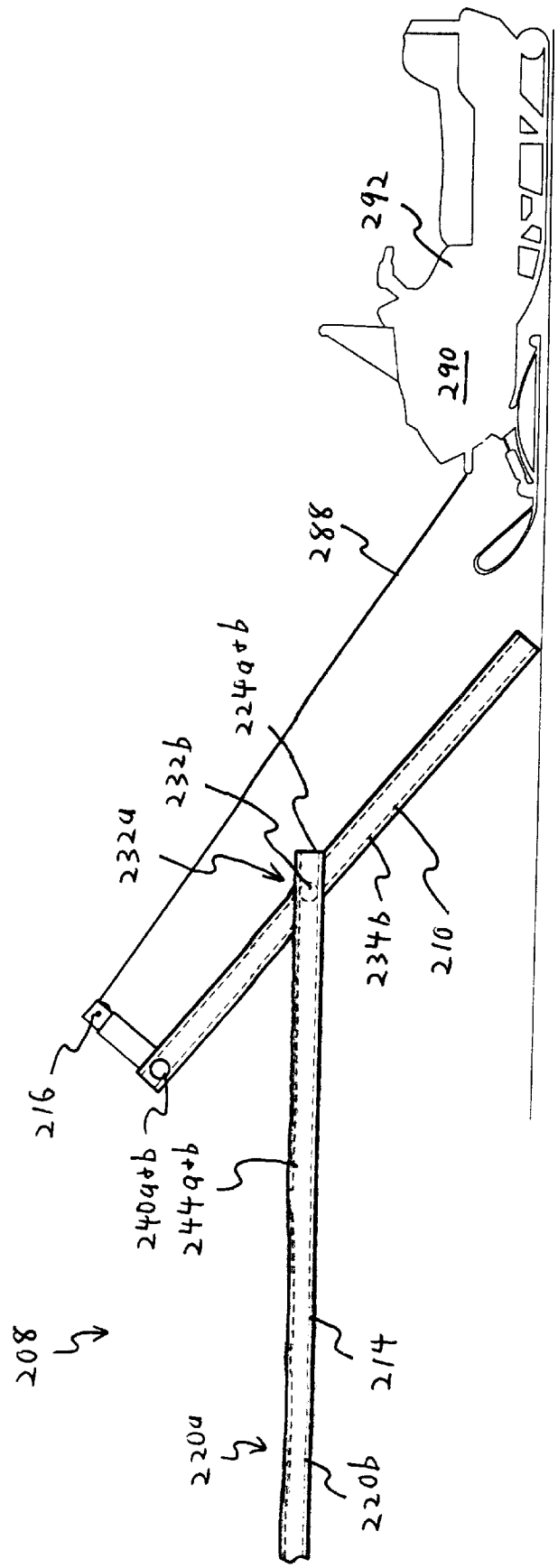
FIG. 16 is a diagrammatic elevational view of a third, simpler embodiment of the invention, useful for loading a snowmobile onto a truck.

Referring to FIG. 16, if the vehicle to be transported is a snowmobile, a third, simpler embodiment of the invention can be used. The third embodiment comprises the same stationary frame 214, and a ramp 210. The carriage is not included in this embodiment.

The stationary frame 214 is almost identical to that used for the first embodiment, but does not include movable support 230 or stop plates 235a and 235b. The rails 220a and 220b include bearings 232a and 232b, and stop plates 250a and 250b, on the rear end portion of the rails, 224a and 224b.

The ramp 212 comprises two parallel rails, 234a and 234b, each having a C-shaped cross section with the open portion facing outward. The pegs 246a and 246b are located on the center portion of the rails 242a and 242b. The bearings 240a and 240b are located on the ramp's front end 262. The openings 244a and 244b are located in the center portions 286a and 286b of the ramp rails 234a and 234b, to correspond with the different location of the bearings.

The winch 216 is located at the front of the ramp 262. The rope or cable 272 runs directly from the winch 216 to the front bumper, 288, of a snowmobile, 290. In use, the ramp 210 is manually slid rearward horizontally, and manually lowered to the ground. The rope or cable 272 is attached to the snowmobile's bumper 288. The winch 216 drags the snowmobile 290 up onto the ramp 210, so that the snowmobile's center of gravity, 292, is slightly rearward of the rear portions, 224a and 224b, of the stationary rails. The ramp 210 can then be manually lifted into a horizontal position, and slid forward into the truck.

It is to be understood that the present invention is not limited to the sole embodiments described above, but encompasses any and all embodiments within the scope of the following claims.

What is claimed is:

1. A device for loading loads onto a vehicle comprising:

a stationary frame comprising a pair of parallel stationary rails, each of said stationary rails having a C-shaped cross section defining an open side, a front end, and a rear end; said stationary frame further including means for attaching said stationary frame to a bed of a vehicle;

said rear end of each said stationary rails including a bearing mounted thereat;

a movable ramp having a platform, and a pair of parallel ramp rails, each of said ramp rails having a front end, a central portion and a rear end, each said ramp rail having a C-shaped cross section defining an open side, wherein said open side of each of said ramp rails faces a respective said open side of each of said stationary rails and respectively receives each of said bearings mounted at said rear ends of each of said stationary rails, said movable ramp being slidably movable between a forward position and a rearward position;

wherein, in said forward position, said front ends of both said stationary frame and said movable ramp and said rear ends of both said stationary frame and said movable ramp are respectively aligned with each other; and wherein, in said rearward position, approximately half of each of said ramp rails extends beyond each respective said rear end of said stationary rails, and said movable ramp being rotatable from a horizontal position to an angled position;

a crossbeam extending between said stationary rails, said crossbeam having a pair of ends, each said end of said crossbeam including a bearing, each of said bearings respectively rolling within each of said stationary rails, each said end of said crossbeam further having a swing arm fixedly coupled thereto, each of said swing arms having first end and second end, said first end of each said swing arm being pivotally attached to respective said ramp rail at said central portion;

a winch mounted to said platform of said movable ramp; and a cable having coupled to said crossbeam and anchored to said winch;

wherein, when said cable is wound on said winch, said movable ramp being maintained in said horizontal position with said front end of said ramp rails adjacent to said crossbeam, and when said cable is unwound on said winch, said movable ramp being maintained in said angled position.

2. The loading device according to claim 1, further comprising an interchangeable carriage for supporting particulate loads upon said platform of said movable ramp, said carriage having a winch connection, said platform including a second winch having a cable for coupling to said winch connection, said second winch maintaining said interchangeable carriage on said movable ramp.

3. The loading device according to claim 2, wherein said carriage further defines four corners, and said carriage further comprises a runner at each corner.

4. The loading device according to claim 2, wherein said carriage further defines four corners, and said carriage further comprises a wheel at each corner.

5. The loading device according to claim 2, wherein said carriage is a vehicle carriage.

6. The loading device according to claim 2, wherein said carriage is a dump bed.

7. The loading device according to claim 2, further comprising a winch support attached to said ramp's front end, and a second winch mounted on said winch support.

8. The loading device according to claim 1, further comprising a motorized drive system for pushing said crossbeam and said ramp horizontally.

9. The loading device according to claim 8, wherein said motorized drive system comprises:
- an internally threaded nut within said crossbeam;
- a motor; and
- a threaded rod extending from said stationary frame's front end to said rearward position of said ramp's front end; said threaded rod fitting within said internally threaded nut.

10. The loading device according to claim 8, wherein said motorized drive system comprises:
- a forward sprocket and a rearward sprocket;
- a motor connected to one of said sprockets; and
- a chain having a pair of ends, said chain passing over said sprockets, and connecting at said ends to said crossbeam.

11. The loading device according to claim 1, further comprising a latch for holding said ramp in said forward position.

12. The loading device according to claim 1,
wherein said ramp rails further have an upper portion, said upper portion having a C-shaped cross section defining an opening facing inward; and
further comprising a carriage comprising a platform, having a front end, a rear end, a front portion, and a rear portion, a pair of rear wheels mounted at said rear end, a pair of guide wheels mounted on said front portion, and a pair of bearings rotatably attached to said front end, wherein said bearings roll within said upper portion of said ramp's rails, said carriage being movable between a forward position wherein said rear end of said carriage is aligned with said rear end of said ramp and said carriage is parallel to said ramp, and a rearward position wherein said rear wheels are on the ground, said carriage is substantially horizontal, and said carriage's front end is within said rear portion of said ramp.

13. The loading device according to claim 12, further comprising a rope and pulley system including said winch, wherein said winch is attached to said ramp, further comprising a rope running to a first pulley at said front end of said ramp, a second pulley at said front end of said carriage, a third pulley at said front end of said ramp, and wherein said rope is attached to said movable support.

14. The loading device according to claim 12, further comprising:
- a U-shaped pin attached to said rear end of said carriage's rails; and
- a latch attached to said rear end of said sliding rails, having a channel dimensionally and positionally suited to receiving said U-shaped pin when said carriage is in said forward position.

15. The loading device according to claim 12, further comprising one or more removable pins passing through holes in said carriage and said ramp when said carriage is in said forward position.

16. The loading device according to claim 1, further comprising:
- a stop plate connected to said rear end of said stationary rails, said stop plate having a channel with a horizontal portion corresponding to the horizontal movement of said ramp, and an arced portion corresponding to the rotation of said ramp; and
- a pin attached to said ramp rails, said pin fitting within said channel in said stop plate.

17. The device for loading loads onto a vehicle according to claim 1, said central portion of each said ramp rails further including a bearing mounted thereat, each of said bearings disposed respectively within each of said stationary rails.

* * * * *